US012675063B2

United States Patent
(12) Nagayama et al.

(10) Patent No.: US 12,675,063 B2
(45) Date of Patent: Jul. 7, 2026

(54) CARRIER FOR ELECTROPHOTOGRAPHIC IMAGE FORMATION, DEVELOPER FOR ELECTROPHOTOGRAPHIC IMAGE FORMATION, ELECTROPHOTOGRAPHIC IMAGE FORMING METHOD, ELECTROPHOTOGRAPHIC IMAGE FORMING APPARATUS, AND PROCESS CARTRIDGE

(71) Applicants: Masashi Nagayama, Shizuoka (JP); Tomomi Suzuki, Shizuoka (JP); Kento Takeuchi, Shizuoka (JP); Tohru Suganuma, Shizuoka (JP)

(72) Inventors: Masashi Nagayama, Shizuoka (JP); Tomomi Suzuki, Shizuoka (JP); Kento Takeuchi, Shizuoka (JP); Tohru Suganuma, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 659 days.

(21) Appl. No.: 18/115,771

(22) Filed: Mar. 1, 2023

(65) Prior Publication Data

US 2023/0305439 A1 Sep. 28, 2023

(30) Foreign Application Priority Data

Mar. 23, 2022 (JP) ................................ 2022-047014
Sep. 14, 2022 (JP) ................................ 2022-146019

(51) Int. Cl.
*G03G 15/08* (2006.01)
*G03G 9/107* (2006.01)
*G03G 9/113* (2006.01)

(52) U.S. Cl.
CPC ....... *G03G 15/0889* (2013.01); *G03G 9/1085* (2020.08); *G03G 9/1139* (2013.01); *G03G 15/0808* (2013.01); *G03G 2215/0607* (2013.01)

(58) Field of Classification Search
CPC .............. G03G 9/1085; G03G 9/1139; G03G 15/0889; G03G 15/0808; G03G 2215/0607
See application file for complete search history.

(56) References Cited

U.S. PATENT DOCUMENTS 6,124,066 A 9/2000 Kim et al.
2020/0257215 A1 8/2020 Kobayashi
(Continued)

FOREIGN PATENT DOCUMENTS

JP S54-155048 12/1979
JP S56-075659 6/1981
(Continued)

OTHER PUBLICATIONS

English machine translation of the description of JP-H11202560-A (Year: 1999).*
(Continued)

*Primary Examiner* — Mark F. Huff
*Assistant Examiner* — Boone Alexander Evans
(74) *Attorney, Agent, or Firm* — XSENSUS LLP

(57) ABSTRACT

A carrier for electrophotographic image formation includes carrier particles. Each of the carrier particles includes a core particle and a coating layer covering the core particle. The coating layer includes diantimony pentoxide-containing particles.

12 Claims, 7 Drawing Sheets

(56) References Cited

U.S. PATENT DOCUMENTS

| | | | |
|---|---|---|---|
| 2020/0319571 A1 | 10/2020 | Takeuchi et al. |
| 2022/0187729 A1 | 6/2022 | Nagayama et al. |
| 2022/0283523 A1 | 9/2022 | Nagayama et al. |
| 2022/0291603 A1 | 9/2022 | Kishida et al. |
| 2022/0291604 A1 | 9/2022 | Suzuki et al. |

FOREIGN PATENT DOCUMENTS

| | | |
|---|---|---|
| JP | S57-040267 | 3/1982 |
| JP | S58-108548 | 6/1983 |
| JP | S58-108549 | 6/1983 |
| JP | S59-166968 | 9/1984 |
| JP | S63-085569 | 4/1988 |
| JP | H01-019584 | 4/1989 |
| JP | H03-000628 | 1/1991 |
| JP | H04-360156 | 12/1992 |
| JP | H05-273789 | 10/1993 |
| JP | H05-303238 | 11/1993 |
| JP | H06-202381 | 7/1994 |
| JP | H07-140723 | 6/1995 |
| JP | H08-006307 | 1/1996 |
| JP | H08-179570 | 7/1996 |
| JP | H08-286429 | 11/1996 |
| JP | H09-080821 | 3/1997 |
| JP | 2683624 | 12/1997 |
| JP | H10-301337 | 11/1998 |
| JP | H11-174740 | 7/1999 |
| JP | H11-202560 | 7/1999 |
| JP | H11202560 A * | 7/1999 |
| JP | H11-515112 | 12/1999 |
| JP | 3120460 | 12/2000 |
| JP | 2007-248814 | 9/2007 |
| JP | 2007248614 A * | 9/2007 |
| JP | 2018-205408 | 12/2018 |
| JP | 2020-129029 | 8/2020 |
| WO | WO 97/12282 | 4/1997 |

OTHER PUBLICATIONS

English machine translation of the description of JP-2007248614-A (Year: 2007).*

* cited by examiner

CARRIER FOR ELECTROPHOTOGRAPHIC IMAGE FORMATION, DEVELOPER FOR ELECTROPHOTOGRAPHIC IMAGE FORMATION, ELECTROPHOTOGRAPHIC IMAGE FORMING METHOD, ELECTROPHOTOGRAPHIC IMAGE FORMING APPARATUS, AND PROCESS CARTRIDGE

CROSS-REFERENCE TO RELATED APPLICATION

The present application claims priority under 35 U.S.C. § 119 to Japanese Patent Application No. 2022-047014, filed Mar. 23, 2022 and Japanese Patent Application No. 2022-146019, filed Sep. 14, 2022, the contents of which are incorporated herein by reference in their entirety.

BACKGROUND OF THE INVENTION

1. Field of the Invention

The disclosures herein generally relate to a carrier for electrophotographic image formation, a developer for electrophotographic image formation, an electrophotographic image forming method, an electrophotographic image forming apparatus, and a process cartridge.

2. Description of the Related Art

In image formation methods of electrophotography, electrostatic photography, etc., generally, a developer is used to develop an electrostatic latent image formed on a latent image bearer. The developer is prepared by stirring and mixing a toner and a carrier. It is important that the developer is a mixture of particles that are appropriately charged. As methods of developing electrostatic latent images, methods using a two-component developer and methods using a one-component developer are generally known. The two-component developer is a developer in which a toner and a carrier are mixed. The one-component developer is a developer that does not include a carrier. A two-component developing system is advantageous because an area used for charging a toner with friction is large as a carrier is used, charging properties are more stable compared to a one-component developing system, and high-quality images are formed for a long period. Moreover, a desirable amount of the toner is suitably supplied to a developing region in the two-component developing system. For the reasons as described, the two-component developing system is widely employed, especially in high-speed devices. The above-described characteristics of the two-component developing system are also effective in a digital electrophotographic system where an electrostatic latent image is formed on a photoconductor with a laser beam etc., and the electrostatic latent image is visualized. Therefore, the two-component developing system is widely employed.

For carriers used in the two-component developing system, an attempt has been made to improve durability of a carrier by coating carrier particles with an appropriate resin material, which is aimed at minimizing fusion of a toner on surfaces of the carrier particles (i.e., toner spent), forming uniform carrier surfaces, reducing oxidation of the surfaces of the carrier particles, minimizing reduction in moisture sensitivity, extending a service life of the developer, protecting a photoconductor from being scratched or worn by the carrier, controlling charging properties, or adjusting a charged amount of the carrier. For example, carrier particles each coated with a certain resin material (Japanese Unexamined Patent Application Publication No. 58-108548), carrier particles where various additives are added to coating layers of the carrier particles (Japanese Unexamined Patent Application Publication Nos. 54-155048, 57-40267, 58-108549, 59-166968, and 06-202381, and Japanese Examined Patent Application Publication Nos. 01-19584 and 03-628), and carrier particles where additives are deposited on surfaces of the carrier particles (Japanese Unexamined Patent Application Publication No. 05-273789) are disclosed. Moreover, Japanese Unexamined Patent Application Publication No. 08-6307 discloses a carrier where a carrier coating material is composed of a guanamine and a thermoset resin that can crosslink with the guanamine resin, and Japanese Patent No. 2683624 discloses use of a cross-linked product between a melamine resin and an acrylic resin as a carrier coating material.

Since the coated carrier is insulated with the resin coating, the coated carrier does not function as a developing electrode. Therefore, an edge effect may be caused particularly on solid images. The edge effect is a phenomenon that an electrical flux density of an electrostatic latent image is intensified at an edge of the electrostatic latent image so that a larger amount of a toner is deposited at the edge of the image compared to the center portion of the image. Moreover, counter charge at the time when the toner is detached becomes large, thus carrier particles tend to be deposited on a non-imaging area for electrostatic developing. In order to solve the above-described problems, for example, resin-coated carrier particles in each of which conductive carbon or conductive filler is dispersed in a coating layer as a conductive agent are proposed (for example, Japanese Unexamined Patent Application Publication Nos. 56-75659, 04-360156, 05-303238, and 11-174740). Moreover, carrier particles, in each of which a conductive material (carbon black) is disposed at a surface of a core particle, and a coating layer is free from a conductive material, are proposed in Japanese Unexamined Patent Application Publication No. 07-140723. Moreover, a carrier proposed in Japanese Unexamined Patent Application Publication No. 08-179570 includes particles each including a coating layer having a concentration gradient of carbon black along a thickness direction of the coating layer where the concentration of the carbon black decreases towards the surface of the coating layer, and the carbon black is not present at the surface of the coating layer. A two-layer coating carrier is proposed in Japanese Unexamined Patent Application Publication No. 08-286429. The proposed two-layer coating carrier includes carrier particles each including a core particle, an inner coating layer disposed on the core particle and including conductive carbon therein, and a surface coating layer disposed on the inner coating layer and including a white conductive material. Moreover, carrier where conductive filler is included in a coating layer is proposed in Japanese Unexamined Patent Application Publication Nos. 04-360156, 05-303238, and 11-174740. Since conductive filler is not limited to carbon and conductive particles can be used in the proposed carrier, a material in a pale color or white can be selected to avoid adverse effects on a toner from a color material that may be used in the coating layer and may be detached from the carrier. Moreover, a carrier where a coating layer includes tin oxide including antimony is proposed in Japanese Unexamined Patent Application Publication No. 2007-248614. The antimony-doped tin oxide has high conductivity, a high electrical resistance regulation capability, and a pale color tone. Therefore, the antimony-doped tin oxide is effective for minimizing discoloration.

SUMMARY OF THE INVENTION (1) A carrier for electrophotographic image formation includes carrier particles. The carrier particles each include a core particle and a coating layer covering the core particle. The coating layer includes diantimony pentoxide-containing particles.

DESCRIPTION OF THE PREFERRED EMBODIMENTS

Figure 1:
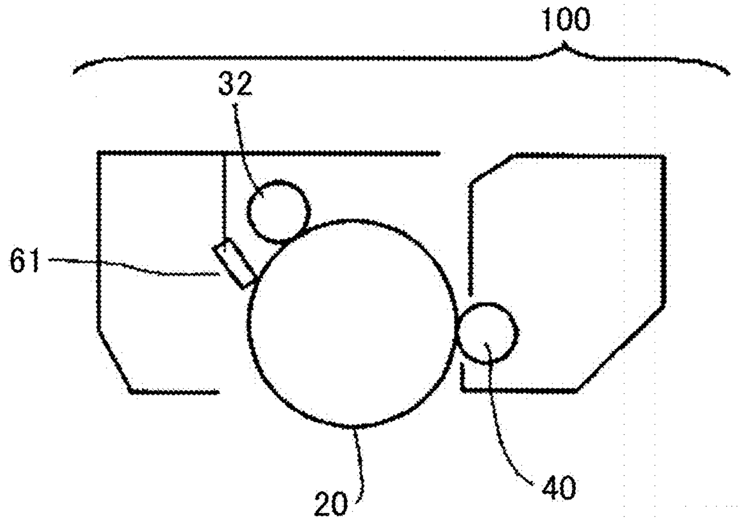
FIG. 1 is a view illustrating an example of the process cartridge of the present disclosure.

In the following, embodiments of the present invention will be described with reference to the accompanying drawings.

Further, the present invention is not limited to these embodiments, but various variations and modifications may be made without departing from the scope of the present invention.

The following problems are known in the art.

When the carriers disclosed in Japanese Unexamined Patent Application Publication Nos. 56-75659, 04-360156, 05-303238, and 11-174740 are used for a developer, carbon particles or resin pieces including carbon particles are detached from coating layers of carrier particles due to friction or impacts among the carrier particles, or between the carrier particles and toner particles. The detached carbon particles or resin pieces may be deposited on the toner particles, or may be used for developing. This is not very problematic when a copy image of black letters etc. using a black toner is formed. With a developer using a color toner, particularly, a yellow toner, or a white toner or clear toner, the above-described detachment of carbon particles or resin pieces notably appears as color contamination (discoloration).

In response to the demands on the market, electrophotographic image forming apparatuses have been improved on processing speed. As high-speed image forming apparatuses are used, stress applied to a developer has been significantly increased. Therefore, a coating layer of each carrier particle may be worn by the stress to expose a carbon-containing layer. Discoloration caused by migration of carbon black to an image cannot be completely avoided with the proposed carriers of Japanese Unexamined Patent Application Publication Nos. 07-140723, 08-179570, and 08-286429.

The technologies proposed in Japanese Unexamined Patent Application Publication Nos. 04-360156, 05-303238, and 11-174740 aim to improve an image quality owing to electric stability of conductive filler. Since a color of the conductive filler is not mentioned, the disclosed technologies are not sufficient for solving the above-described problem associated with discoloration.

Moreover, diantimony trioxide disclosed in Japanese Unexamined Patent Application Publication No. 2007-248614 has been identified as being hazardous to human bodies, thus use of diantimony trioxide is not preferred.

The present inventors diligently conducted research to solve the above-described problems. As a result, the present inventors attained the following insights. A carrier for electrophotographic image formation, a developer for electrophotographic image formation, an electrophotographic image forming method, an electrophotographic image forming apparatus, and a process cartridge, which minimize an edge effect, avoid carrier deposition on a non-imaging area, and minimize discoloration, can be provided when the carrier includes carrier particles each including a core particle and a coating layer covering the core particle, where the coating layer includes diantimony pentoxide-containing particles.

As described above, antimony is an effective material to be added to a coating layer as an electrical resistance regulator to adjust electrical resistance. The antimony is also effective for minimizing discoloration as the color tone of the antimony is pale. However, diantimony trioxide, which is an antimony-based substance typically used for adjusting resistance, has been identified as being hazardous to human bodies, thus the diantimony trioxide is not a material preferably used. As a result of the research diligently conducted by the present inventors, it has been found that use of particles including diantimony pentoxide, instead of diantimony trioxide, can reduce hazards to human bodies, and assures a desired electrical resistance regulation capability and discoloration minimizing effect.

An object of the present disclosure is to provide a carrier for electrophotographic image formation that is less likely to cause an edge effect, suppresses deposition of the carrier in a non-imaging area even when the carrier is used over a long period, and can reduce discoloration.

The present disclosure provides a carrier for electrophotographic image formation that is less likely to cause an edge effect, suppresses deposition of the carrier in a non-imaging area even when the carrier is used over a long period, and can reduce discoloration.

Embodiments of the present disclosure will be described in detail hereinafter.

The carrier for electrophotographic image formation of the present disclosure is as described in (1) above, but the present disclosure also suitably includes the following embodiments (2) to (14).

(2) The carrier according to (1),
wherein each of the diantimony pentoxide-containing particles includes diantimony pentoxide-doped tin oxide.

(3) The carrier according to (1) or (2),
wherein each of the diantimony pentoxide-containing particles includes a base particle that is an inorganic particle.

(4) The carrier according to (3),
wherein the base particle is a particle of aluminium oxide.

(5) The carrier according to any one of (1) to (4),
wherein the coating layer further includes inorganic particles other than the diantimony pentoxide-containing particles.

(6) The carrier according to (5),
wherein the inorganic particles other than the diantimony pentoxide-containing particles are white particles.

(7) The carrier according to (5) or (6),
wherein each of the inorganic particles other than the diantimony pentoxide-containing particles includes barium sulfate.

(8) The carrier according to (7),
wherein each of the inorganic particles other than the diantimony pentoxide-containing particles is a particle of barium sulfate alone.

(9) A developer for electrophotographic image formation, including the carrier according to any one of (1) to (8) and a toner.

(10) An electrophotographic image forming apparatus including an electrostatic latent image bearer, and a developing device including the developer according to (9).

(11) An electrophotographic image forming apparatus including an electrostatic latent image bearer, and a developing device that includes a developer bearer and a developer-supplying transporting member, and satisfies the following condition (1) or (2),
wherein the developer bearer is configured to rotate with a two-component developer, which includes the carrier according to any one of (1) to (8) and a toner, borne on a surface of the developer bearer to supply the toner to the electrostatic latent image bearer at a position where the developer bearer faces the electrostatic latent image bearer to perform developing, and
wherein the developer-supplying transporting member is configured to transport the two-component developer along an axial direction of the developer bearer and to supply the two-component developer to the developer bearer to form a developer-supplying transportation path with the developer-supplying transporting member,

[Condition (1)]
the developing device further includes a developer-stirring transporting member and a partitioning member,
wherein, where an excess developer is the two-component developer that has not been used for developing and is transported to a downstream end of the developer-supplying transportation path relative to a transporting direction of the developer-supplying transportation path,
the developer-stirring transporting member is configured to receive the excess developer to transport the excess developer along the axial direction of the developer bearer in a reverse direction to the direction in which the developer-supplying transporting member transports the two-component developer, while stirring the excess developer, to form a developer-stirring transportation path with the developer-stirring transporting member,
wherein the developer-supplying transportation path and the developer-stirring transportation path are separated by the partitioning member across a central part in a longitudinal direction of the developer-supplying transportation path and the developer-stirring transportation path, the central part excluding both ends in the longitudinal direction, and
wherein the two-component developer borne on the developer bearer and passed through the position where the developer bearer faces the electrostatic latent image bearer is recovered into the developer-stirring transportation path, the recovered two-component developer is mixed with the excess developer transported via the developer-stirring transportation path, and the mixed developer is supplied from the downstream end of the developer-stirring transportation path to the developer-supplying transportation path,

[Condition (2)]
the developing device further includes a developer-recovering transporting member, a developer-stirring transporting member, and a partitioning member,
wherein the developer-recovering transporting member is configured to recover the two-component developer that is borne on the developer bearer and is passed through the position where the developer bearer faces the electrostatic latent image bearer, and to transport the recovered two-component developer along the axial direction of the developer bearer in the same direction as the direction in which the developer-supplying transporting member transports the two-component developer, to form a developer-recovering transportation path with the developer-recovering transporting member,
wherein, where an excess developer is the two-component developer that has not been used for developing and is transported to a downstream end of the developer-supplying transportation path relative to the transportation direction of the developer-supplying transportation path, and a recovered developer is the two-component developer that is recovered by the developer-recovering transporting member,
the developer-stirring transporting member is configured to receive the excess developer and the recovered developer to transport the excess developer and the recovered developer along the axial direction of the developer bearer in a reverse direction to the direction in which the developer-supplying transporting member transports the two-component developer, while stirring the excess developer and the recovered developer, to form a developer-stirring transportation path with the developer-stirring transporting member, and
wherein the developer-supplying transportation path, the developer-recovering transportation path, and the developer-stirring transportation path are separated from one another by the partitioning member.

(12) An electrophotographic image forming method including forming an image with the developer according to (9).

(13) An electrophotographic image forming method including using an electrophotographic image forming apparatus including an electrostatic latent image bearer, a developing device, and a developer for electrophotographic image formation where the developer is a two-component developer including the carrier according to any one of (1) to (8) and a toner, wherein the developing device includes a developer bearer and a developer-supplying transporting member, and satisfies the following condition (1) or (2), wherein the developer bearer is configured to rotate with the two-component developer borne on a surface of the developer bearer to supply the toner to the electrostatic latent image bearer at a position where the developer bearer faces the electrostatic latent image bearer to perform developing, and wherein the developer-supplying transporting member is configured to transport the two-component developer along an axial direction of the developer bearer and to supply the two-component developer to the developer bearer to form a developer-supplying transportation path with the developer-supplying transporting member,

[Condition (1)]

the developing device further includes a developer-stirring transporting member and a partitioning member, wherein, where an excess developer is the two-component developer that has not been used for developing and is transported to a downstream end of the developer-supplying transportation path relative to a transporting direction of the developer-supplying transportation path, the developer-stirring transporting member is configured to receive the excess developer to transport the excess developer along the axial direction of the developer bearer in a reverse direction to the direction in which the developer-supplying transporting member transports the two-component developer, while stirring the excess developer, to form a developer-stirring transportation path with the developer-stirring transporting member, wherein the developer-supplying transportation path and the developer-stirring transportation path are separated by the partitioning member across a central part in a longitudinal direction of the developer-supplying transportation path and the developer-stirring transportation path, the central part excluding both ends in the longitudinal direction, and wherein the two-component developer borne on the developer bearer and passed through the position where the developer bearer faces the electrostatic latent image bearer is recovered into the developer-stirring transportation path, the recovered two-component developer is mixed with the excess developer transported via the developer-stirring transportation path, and the mixed developer is supplied from the downstream end of the developer-stirring transportation path to the developer-supplying transportation path,

[Condition (2)]

the developing device further includes a developer-recovering transporting member, a developer-stirring transporting member, and a partitioning member, wherein the developer-recovering transporting member is configured to recover the two-component developer that is borne on the developer bearer and is passed through the position where the developer bearer faces the electrostatic latent image bearer, and to transport the recovered two-component developer along the axial direction of the developer bearer in the same direction as the direction in which the developer-supplying transporting member transports the two-component developer, to form a developer-recovering transportation path with the developer-recovering transporting member, wherein, where an excess developer is the two-component developer that has not been used for developing and is transported to a downstream end of the developer-supplying transportation path relative to the transportation direction of the developer-supplying transportation path, and a recovered developer is the two-component developer that is recovered by the developer-recovering transporting member, the developer-stirring transporting member is configured to receive the excess developer and the recovered developer to transport the excess developer and the recovered developer along the axial direction of the developer bearer in a reverse direction to the direction in which the developer-supplying transporting member transports the two-component developer, while stirring the excess developer and the recovered developer, to form a developer-stirring transportation path with the developer-stirring transporting member, and wherein the developer-supplying transportation path, the developer-recovering transportation path, and the developer-stirring transportation path are separated from one another by the partitioning member.

(14) A process cartridge including the developer according to (9), and a developing device configured to develop a latent electrostatic image with the developer.

The diantimony pentoxide-containing particles may be an embodiment where diantimony pentoxide is included in each of particles of a material other than the diantimony pentoxide, or an embodiment where each of particles is made up of the diantimony pentoxide alone. A particularly preferred embodiment is particles of diantimony pentoxide-doped tin oxide because such material can function as a highly effective electrical resistance regulator.

In each of the diantimony pentoxide-containing particles, the diantimony pentoxide is preferably present on a surface of each of base particles that are inorganic particles. Since the inorganic particles are used as base particles, an electrical resistance regulation capability can be maintained even if the diantimony pentoxide-containing particles are broken into fragments within a coating layer of a carrier particle, and the fragments are detached from the coating layer. As the inorganic particles that are the base particles, any of known materials may be used. Use of aluminium oxide is particularly preferred as an electrical resistance regulation capability becomes significant. It is assumed that aluminium oxide has suitable compatibility to a conduction processing performed on surfaces of the base particles so that the processing can effectively impart intended properties to the base particles.

In the present disclosure, an amount of the diantimony pentoxide in the coating layer is preferably from 0.1% by mass to 40.0, by mass, more preferably from 0.4% by mass to 15.03 by mass.

A volume average particle diameter of the diantimony pentoxide-containing particles is preferably from 0.2 μm to 0.9 μm, more preferably from 0.3 μm to 0.7 μm.

The coating layer includes the diantimony pentoxide-containing particles where the diantimony pentoxide-containing particles are preferably dispersed in the coating layer. The coating layer preferably further includes inorganic particles other than the diantimony pentoxide-containing particles. Since the inorganic particles other than the diantimony pentoxide-containing particles are included in the coating layer, durability of the coating layer against abrasion is improved to minimize deteriorations due to wearing or scraping. The presence of the diantimony pentoxide-containing particles also improves the durability of the coating layer, but the adjustment of the amount of the diantimony pentoxide-containing particles in the coating layer cannot be used to improve the durability because the electrical resistance values of carrier particles vary depending on the amount of the diantimony pentoxide-containing particles. Therefore, durability of the coating layer is preferably adjusted with the amount of the inorganic particles other than the diantimony pentoxide-containing particles. For the inorganic particles other than the diantimony pentoxide-containing particles, any of known materials may be used, or a novel material may be used.

The inorganic particles other than the diantimony pentoxide are preferably white particles. The diantimony pentoxide is a pale-colored material, but not completely white. In the case where the diantimony pentoxide-doped tin oxide is used, the color of the resulting particles becomes close to white, but the color tone varies depending on an amount of the dopant. Selection of white inorganic particles as the inorganic particles other than the diantimony pentoxide-containing particles enables to adjust the overall color tone of the particles in the coating layer to the paler tone, which is effective for minimizing discoloration.

Preferred examples of the inorganic particles other than the diantimony pentoxide include aluminium oxide, titanium oxide, zinc oxide, magnesium oxide, magnesium hydroxide, and barium sulfate. Among the above-listed examples, zinc oxide, magnesium oxide, magnesium hydroxide, and barium sulfate are preferably used because an effect of negatively charging a toner is improved. Use of barium sulfate is particularly preferred as the above-described effect becomes significant.

When barium sulfate is used as the inorganic particles other than the diantimony pentoxide, the inorganic particles are preferably particles of barium sulfate alone. The barium sulfate is present at a surface of a coating layer and comes into contact with a toner to exhibit an effect of imparting charge to the toner. When the barium sulfate is not used as particles of barium sulfate alone, a probability of the barium sulfate coming into contact with a toner is reduced, thus the maximum effect of imparting charge cannot be exhibited. The term "particles of barium sulfate alone" means that particles used as the "inorganic particles other than the diantimony pentoxide" are each made up of only barium sulfate.

An amount of the inorganic particles other than the diantimony pentoxide in the coating layer is preferably from 1 by mass to 55, by mass, and more preferably from 4% by mass to 505 by mass.

Particle diameters of the inorganic particles other than the diantimony pentoxide are not particularly limited, but preferably satisfy the following formula:

$$T \leq h \quad \text{[Formula]}$$

where T is an average thickness of the coating layer and h is the average particle diameter of the inorganic particles.

Since the average particle diameter of the inorganic particles other than the diantimony pentoxide is set to be greater than the thickness of the coating layer, a probability of the particles projecting from the surface of the coating layer increases. If peaks of the particles are projected from the coating layer, the projected peaks function as a spacer between a subject to be rubbed against and the resin of the coating layer when the carrier particles are rubbed against one another, or the carrier particles are rubbed against a wall surface of a storage container or a transportation unit, which may extend a service life of the coating layer. In addition, the probability of the particles coming into contact with a toner increases, thus the above-described relationship is also preferable in view of an effect of imparting charge to the toner.

The particle diameters of the inorganic particles may be determined by any of known methods in the art. For example, the particle diameters of the inorganic particles, before adding to a coating layer to form a carrier, may be measured by Nanotrac UPA (available from NIKKISO CO., LTD.). The particle diameters of the inorganic particles, after adding to a coating layer to form a carrier, may be determined by curing the coating layer disposed on the surface of the carrier particle with FIB, and observing the cross-section of the carrier particle by SEM, EDX, etc. An example of the measuring method will be described below.

The carrier is mixed with a resin (30 minute-curable two-part epoxy resin, available from Devcon) to embed the carrier particles in the resin, and the obtained mixture is left to stand overnight or longer to cure the resin. A rough cross-section sample is prepared by mechanical polishing. The surface of the rough cross-section sample is finished by a cross-section polisher (SM-09010, available from JEOL Ltd.) at accelerated voltage of 5.0 kV and a beam current of 120 ρA. The obtained sample is observed and an image of the sample is captured by a scanning electron microscope (Merlin, available from Carl Zeiss Co., Ltd.) at acceleration voltage of 0.8 kV and magnification of 30,000×. The captured image is converted into a TIFF file image, and diameters of circles equivalent to 100 inorganic particles, respectively, are measured using software (Image-Pro Plus, available from Media Cybernetics, Inc.). An average of the measured values is determined as an average diameter of the inorganic particles.

The method of determining the diameters of the inorganic particles is not limited to the above-described method. Moreover, the thickness of the coating layer can be measured from the captured image in the similar manner. However, there are variations in size among the particles and a thickness of a coating layer varies depending on a position on the carrier particle. Therefore, the measurement should not be performed only with one particle or in one position, but with numbers of particles or at numbers of positions ([n] particles or [n] positions) unless it is not statistically problematic.

In the present disclosure, the term "average particle diameter" refers to a volume average particle diameter, unless otherwise stated. For example, a volume average particle diameter may be measured by the above-described method.

In the present disclosure, the coating layer may include a resin, and may further include other components as necessary. As the resin, a silicone resin, an acrylic resin, or a combination of a silicone resin and an acrylic resin may be used. The acrylic resin has excellent abrasion resistance due to high adhesion and low brittleness of the acrylic resin. On the other hand, the acrylic resin has high surface energy; therefore, in the case where the carrier using the acrylic resin in the coating layer is used in combination with a toner that tends to cause "spent," a problem, such as reduction in charge of the carrier, may occur due to accumulation of the toner components by the spent. The "spent" is a phenomenon that the toner is fused on surfaces of carrier particles to contaminate the carrier particles. In this case, use of a silicone resin in combination with the acrylic resin can solve the above-described problem, as the silicone resin is unlikely to cause spent of toner components due to low surface energy. In addition, accumulation of the fused toner components by the spent is unlikely to occur because the coating layer of the carrier particles may be scraped. However, the silicone resin also has a disadvantage such that the silicone resin has inadequate abrasion resistance due to weak adhesion and high brittleness. Therefore, it is important to suitably balance out the characteristics of the acrylic resin and the characteristics of the silicone resin. By achieving this balance, a coating film that does not cause spent and has desirable abrasion resistance can be obtained. As the silicone resin has low surface energy, spent of toner components is unlikely to occur, and the silicone resin causes a coating layer to be scraped to hinder the spent toner components from accumulating.

In the present specification, the term "silicone resin" refers to all silicone resins typically known. Examples of the silicone resin include, but are not limited to, straight-silicone composed of organosiloxane bonds, and modified silicone resins obtained by modifying silicone resins with alkyd, polyester, epoxy, acryl, urethane, etc. Examples of commercial products of the straight silicone resins include: KR271, KR255, and KR152, all available from Shin-Etsu Chemical Co., Ltd.; and SR2400, SR2406, SR2410, all available from DuPont Toray Specialty Materials K.K. It is possible to use a silicone resin alone, but it is also possible to use a silicone resin together with other components that induce a cross-linking reaction, a charge regulation component, etc. Examples of commercial products of the modified silicone resins include: KR206 (alkyd-modified), KR5208 (acryl-modified), ES1001N (epoxy-modified), and KR305 (urethane-modified), all available from Shin-Etsu Chemical Co., Ltd.; and SR2115 (epoxy-modified) and SR2110 (alkyd-modified) both available from DuPont Toray Specialty Materials K.K.

Examples of the polycondensation catalyst include titanium-based catalysts, tin-based catalysts, zirconium-based catalysts, and aluminium-based catalysts. Among the above-listed various catalysts, titanium-based catalysts are preferable because of excellent performance thereof. Among the titanium-based catalysts, titanium diisopropoxy bis(ethylacetoacetate) is particularly preferred as a catalyst. The titanium diisopropoxy bis(ethylacetoacetate) has a significant effect of accelerating a condensation reaction of silanol groups, and the catalytic effect thereof is suitably maintained.

In the present specification, the term "acrylic resin" refers to any resin including an acrylic component. The acrylic resin is not particularly limited. A single acrylic resin may be used, or the acrylic resin may be used in combination with at least one other component that induces a cross-linking reaction. Examples of the at least one other component that induces a cross-linking reaction include, but are not limited to, amino resins, and acid catalysts. The amino resins include, but are not limited to, guanamine, melamine resin, etc. In the present specification, the term "acid catalyst" refers to any acid compound exhibiting catalytic functions. Examples of the acid catalyst include, but are not limited to, acid catalysts each including a reactive group, such as completely alkylated acid catalysts, methylol group-containing acid catalysts, imino group-containing acid catalysts, and methylol/imino group-containing acid catalysts.

Moreover, the coating layer more preferably includes a cross-linked product between an acrylic resin and an amino resin. The inclusion of the cross-linked product in the coating layer can suppress fusion among the coating layers of the carrier particles while maintaining suitable elasticity of the coating layers.

The amino resin is not particularly limited, but the amino resin is preferably a melamine resin or benzoguanamine because an ability of the carrier to apply charge can be improved. In the case where it is desired to appropriately regulate the ability of the carrier to impart charge, a melamine resin and/or benzoguanamine may be used in combination with another amino resin. The acrylic resin that can crosslink with the amino resin is preferably an acrylic resin including a hydroxyl group and/or a carboxyl group, more preferably an acrylic resin including a hydroxyl group. Such an acrylic resin can improve adhesion to core particles or conductive particles, and can also improve dispersion stability of the conductive particles. The acrylic resin has a hydroxyl value of 10 mgKOH/g or greater, more preferably 20 mgKOH/g or greater.

The composition of the coating layer preferably includes a silane-coupling agent. The silane-coupling agent can contribute to stable dispersion of the conductive particles in the coating layer.

Examples of the silane-coupling agent include, but are not limited to, γ-(2-aminoethyl)aminopropyltrimethoxysilane, γ-(2-aminoethyl)aminopropylmethyldimethoxysilane, γ-methacryloxypropyltrimethoxysilane, N-β-(N-vinylbenzylaminoethyl)-γ-aminopropyltrimethoxysilane hydrochloride, γ-glycidyloxypropyltrimethoxysilane, γ-mercaptopropyltrimethoxysilane, methyltrimethoxysilane, methyltriethoxysilane, vinyltriacetoxysilane, γ-chloropropyltrimethoxysilane, hexamethyldisilazane, γ-anilinopropyltrimethoxysilane, vinyltrimethoxysilane, octadecyldimethyl [3-(trimethoxysilyl)propyl]ammonium chloride, γ-chloropropylmethyldimethoxysilane, methyltrichlorosilane, dimethyldichlorosilane, trimethylchlorosilane, allyltriethoxysilane, 3-aminopropylmethyldiethoxysilane, 3-aminopropyltrimethoxysilane, dimethyldiethoxysilane, 1,3-divinyltetramethyldisilazane, and mehacryloxyethyldimethyl(3-trimethoxysilylpropyl)ammonium chloride. The above-listed examples may be used in combination.

Examples of commercial products of the silane-coupling agent include AY43-059, SR6020, SZ6023, SH6026, SZ6032, SZ6050, AY43-310M, SZ6030, SH6040, AY43-026, AY43-031, sh6062, Z-6911, sz6300, sz6075, sz6079, sz6083, sz6070, sz6072, Z-6721, AY43-004, Z-6187, AY43-021, AY43-043, AY43-040, AY43-047, Z-6265, AY43-204M, AY43-048, Z-6403, AY43-206M, AY43-206E, Z6341, AY43-210MC, AY43-083, AY43-101, AY43-013, AY43-158E, Z-6920, and Z-6940 (all available from DuPont Toray Specialty Materials K.K.).

An amount of the silane-coupling agent is preferably from 0.1% by mass to 10; by mass, relative to the amount of the silicone resin. When the amount of the silane-coupling agent is 0.1% by mass or greater, adhesion between the silicone resin and the core particles or conductive particles improves to avoid detachment of the coating layers from the carrier particles even after using the carrier particles for a long period. When the amount of the silane-coupling agent is 10% by mass or less, toner filming, which may be caused after using the carrier particles for a long period, can be minimized.

A volume average particle diameter of the core particles of the carrier of the present disclosure is not particularly limited. To prevent carrier deposition and carrier scattering, the volume average particle diameter is preferably 20 μm or greater. To prevent reduction in image quality, the volume average particle diameter is preferably 100 μm or less. Particularly, the core particles having the volume average particle diameter of from 20 μm to 60 μm can be more suitably used to meet the current demands for high image quality. For example, the volume average particle diameter may be measured by Microtrac particle size analyzer (model: HRA9320-X100, available from NIKKISO CO., LTD.).

The core particles used for the carrier of the present disclosure are appropriately selected from core particles that are known as carrier particles for a two-component developer for electrophotographic image formation. Examples of the core particles include: ferromagnetic metals, such as iron and cobalt; iron oxides, such as magnetite, hematite, and ferrite; various alloys and compounds; and resin particles in each of which any of the foregoing magnetic materials is dispersed in a resin. Among the above-listed examples, the material of the preferred core particles is Mn-based ferrite, Mn/Mg-based ferrite, or Mn/Mg/Sr ferrite, considering the environmental friendliness. Specifically, preferred examples of the core particles include LDC-200 (available from Powdertech Co., Ltd.) and DFC-400M (available from DOWA Electronics Materials Co., Ltd.).

The carrier of the present disclosure can be produced, for example, by dissolving the resin etc. in a solvent to prepare a coating solution, uniformly applying the coating solution onto surfaces of the core particles according to any of coating methods known in the art, and drying the coated core particles, followed by baking. Examples of the coating methods include dip coating, spray coating, and brush coating.

The solvent is not particularly limited, and may be appropriately selected in accordance with the intended purpose. Examples of the solvent include toluene, xylene, methyl ethyl ketone, methyl isobutyl ketone, cellosolve, butyl acetate, and synthetic isoparaffin hydrocarbons.

A method of the baking is not particularly limited and may be appropriately selected in accordance with the intended purpose. For example, an external heating system may be used, or an internal heating system may be used.

A device used for the baking is not particularly limited and may be appropriately selected in accordance with the intended purpose. Examples of the device include fixed electric furnaces, fluidized bed electric furnaces, rotary electric furnaces, combustion furnaces, and devices utilizing microwaves.

An average thickness of the coating layer is preferably 0.1 μm or greater and 1.0 μm or less, and more preferably 0.1 μm or greater and 0.9 μm or less. For example, the average thickness of the coating layer may be measured by observing cross-sections of the carrier particles under a transmission electron microscopy (TEM).

The developer of the present disclosure includes the carrier of the present disclosure, and further includes a toner.

The toner may include a binder resin, a colorant, a release agent, a charge-control agent, external additives, etc. The toner may be a monochrome toner, a color toner, a white toner, a transparent toner, or a toner having metallic gloss. A production method for the toner may be any of known methods, such as a pulverization method, a polymerization method, or any other production methods.

One of the objects of the carrier of the present disclosure is to minimize carbon black contamination of the toner. The effect as mentioned becomes significant when a color toner, particularly a yellow toner, a white toner, or a transparent toner is used for a developer.

The toner may be produced by any of methods known in the art, such as a pulverization method and a polymerization method. In a case where a toner is produced by a pulverization method, for example, materials constituting a toner are kneaded, the obtained melt-kneaded product is cooled, the cooled product is pulverized and classified to prepare base particles. To improve transfer properties and durability, external additives are added to the base particles to produce a toner.

A device used for kneading the materials constituting the toner is not particularly limited. Examples of the device include batch-type twin-roll kneaders; Banbury Mixer; continuous twin-screw extruders, such as KTK twin-screw extruder (available from Kobe Steel, Ltd.), TEM twin-screw extruder (available from SHIBAURA MACHINE CO., LTD.), a twin-screw extruder (available from KCK), PCM twin-screw extruder (available from Ikegai Corp), and KEX twin-screw extruder (available from Kurimoto, Ltd.); and continuous single-screw kneaders, such as a co-kneader (available from BUSS AG).

For pulverizing the cooled melt kneaded product, the melt kneaded product may be roughly crushed by a hammer mill or Rotoplex, followed by finely grinding using a pulverizer using a jet flow, or a mechanical pulverizer. The melt kneaded product is preferably pulverized into particles having an average particle diameter of from 3 μm to 15 μm.

Moreover, an air classifier etc. may be used to classify the pulverized melt-kneaded product. The classification is preferably performed to acquire toner base particles having the average particle dimeter of from 5 μm to 20 μm.

In order to add external additives to the toner base particles, moreover, the external additives and the toner base particles may be stirred by a mixer etc. so that the external additives are deposited on surfaces of the toner base particles, as the external additives are crushed.

Examples of the binder resin include, but are not limited to, homopolymers of styrene and substituted styrene, such as polystyrene, poly(p-styrene), and polyvinyl toluene; styrene-based copolymers, such as styrene-p-chlorostyrene copolymers, styrene-propylene copolymers, styrene-vinyl toluene copolymers, styrene-methyl acrylate copolymers, styrene-ethyl acrylate copolymers, styrene-methacrylic acid copolymers, styrene-methyl methacrylate copolymers, styrene-ethyl methacrylate copolymers, styrene-butyl methacrylate copolymers, styrene-methyl α-chloromethacrylate copolymers, styrene-acrylonitrile copolymers, styrene-vinyl methyl ether copolymers, styrene-vinyl methyl ketone copolymers, styrene-butadiene copolymers, styrene-isoprene copolymers, and styrene-maleic acid ester copolymers; others, such as polymethyl methacrylates, polybutyl methacrylates, polyvinyl chlorides, polyvinyl acetates, polyethylenes, polyesters, polyurethanes, epoxy resins, polyvinyl butyrals, polyacrylic acids, rosin, modified rosin, terpene resins, phenol resins, aliphatic or aromatic hydrocarbon resins, and aromatic petroleum resins. The above-listed examples may be used in combination.

A binder resin suitable for pressure fixing is not particularly limited.

Examples of the binder resin suitable for pressure fixing include, but are not limited to, polyolefins (e.g., low-molecular-weight polyethylene and low-molecular-weight polypropylene), olefin copolymers (e.g., ethylene-acrylic acid copolymers, ethylene-acrylic acid ester copolymers, styrene-methacrylic acid copolymers, ethylene-methacrylic acid ester copolymers, ethylene-vinyl chloride copolymers, ethylene-vinyl acetate copolymers, and ionomer resins), epoxy resins, polyesters, styrene-butadiene copolymers, polyvinyl pyrrolidone, methyl vinyl ether-maleic anhydride copolymers, maleic acid-modified phenol resins, and phenol-modified terpene resins. The above-listed examples may be used in combination.

Examples of the colorant (e.g., a pigment or a dye) include, but are not limited to, yellow pigments, such as cadmium yellow, mineral fast yellow, nickel titanium yellow, naples yellow, naphthol yellow S, Hansa yellow G, Hansa yellow 10G, benzidine yellow GR, quinoline yellow lake, permanent yellow NCG, tartrazine lake; orange pigments, such as molybdenum orange, permanent orange GTR, pyrazolone orange, vulcan orange, indanthrene brilliant orange RK, benzidine orange G, indanthrene brilliant orange GK; red pigments, such as red iron oxide, cadmium red, permanent red 4R, lithol red, pyrazolone red, watching red calcium salt, lake red D, brilliant carmine 6B, eosin lake, rhodamine lake B, alizarin lake, brilliant carmine 3B; violet pigments, such as fast violet B, and methyl violet lake; blue pigments, such as cobalt blue, alkali blue, Victoria blue lake, phthalocyanine blue, metal-free phthalocyanine blue, partially chlorinated products of phthalocyanine blue, fast sky blue, and indanthrene blue BC; green pigments, such as chrome green, chromium oxide, pigment green B, malachite green lake; azine dyes, such as carbon black, oil furnace black, channel black, lamp black, acetylene black, and aniline black; black pigments, such as metal salt azo dyes, metal oxide, and complex metal oxide; and white pigments, such as titanium oxide. The above-listed examples may be used in combination. In case of a transparent toner, the colorant may not be used.

The release agent is not particularly limited. Examples of the release agent include polyolefins (e.g., polyethylene and polypropylene), metal salts of fatty acids, fatty acid esters, paraffin wax, amide wax, multivalent alcohol wax, silicone varnish, carnauba wax, and ester wax. The above-listed examples may be used in combination.

The toner may further include a charge-control agent. Examples of the charge-control agent include, but are not limited to, nigrosine; C2-C16 alkyl group-containing azine-based dyes; basic dyes, such as C.I. Basic Yellow 2 (C.I. 41000), C.I. Basic Yellow 3, C.I. Basic Red 1 (C.I. 45160), C.I. Basic Red 9 (C.I. 42500), C.I. Basic Violet 1 (C.I. 42535), C.I. Basic Violet 3 (C.I. 42555), C.I. Basic Violet (C.I. 45170), C.I. Basic Violet 14 (C.I. 42510), C.I. Basic Blue 1 (C.I. 42025), C.I. Basic Blue 3 (C.I. 51005), C.I. Basic Blue 5 (C.I. 42140), C.I. Basic Blue 7 (C.I. 42595), C.I. Basic Blue 9 (C.I. 52015), C.I. Basic Blue 24 (C.I. 52030), C.I. Basic Blue 25 (C.I. 52025), C.I. Basic Blue 26 (C.I. 44045), C.I. Basic Green 1 (C.I. 42040), and C.I. Basic Green 4 (C.I. 42000); lake pigments of the foregoing basic dyes; quaternary ammonium salts, such as C.I. Solvent Black 8 (C.I. 26150), benzoylmethylhexadecyl ammonium chloride, and decyltrimethyl chloride; dialkyl tin compounds, such as dibutyl tin compounds and dioctyl tin compounds; dialkyl tin borate compounds; guanidine derivatives; polyamine resins, such as amino group-containing vinyl polymers and amino group-containing condensed polymers; metal (e.g., Zn, Al, Co, Cr, and Fe) complexes with salicylic acid, dialkyl salicylic acid, naphthoic acid, or dicarboxylic acid; sulfonated copper phthalocyanine pigments; organic borates; fluorine-containing quaternary ammonium salts; and calixarene compounds. The above-listed examples may be used in combination. In a color toner, other than a black toner, a white charge-control agent, such as a metal salt of a salicylic acid derivative, is preferably used.

Examples of the external additives include, but are not limited to, inorganic particles, such as silica, titanium oxide, alumina, silicon carbide, silicon nitride, and boron nitride; and resin particles (e.g., polymethyl methacrylate particles and polystyrene particles) produced by soap-free emulsion polymerization and having an average particle diameter of from 0.05 μm to 1 μm. The above-listed examples may be used in combination. Among the above-listed examples, metal oxide particles (e.g., silica and titanium oxide) to which hydrophobicity is imparted by a surface treatment are preferable. A toner having excellent charging stability regardless of humidity can be obtained by using hydrophobic silica and hydrophobic titanium oxide in combination and adjusting an amount of the hydrophobic titanium oxide greater than an amount of the hydrophobic silica.

The electrophotographic image forming method of the present disclosure includes forming an image using the developer of the present disclosure. The electrophotographic image forming apparatus of the present disclosure includes the developer of the present disclosure.

The electrophotographic image forming method of the present disclosure may include: forming an electrostatic latent image on an electrostatic latent image bearer (including charging the electrostatic latent image bearer, and exposing the electrostatic latent image bearer to light to form an electrostatic latent image on the electrostatic latent image bearer); developing the electrostatic latent image formed on the electrostatic latent image bearer with the developer of the present disclosure to form a toner image; transferring the toner image formed on the electrostatic latent image bearer to a recording medium; and fixing the transferred toner image on the recording medium. The electrophotographic image forming method of the present disclosure may further include other steps.

The image forming apparatus of the present disclosure includes an electrostatic latent image bearer. The image forming apparatus may further include a charging unit configured to charge the electrostatic latent image bearer, an exposure unit configured to expose the electrostatic latent image bearer to form an electrostatic latent image on the electrostatic latent image bearer, a developing unit configured to develop the electrostatic latent image formed on the electrostatic latent image bearer with a developer to form a toner image, a transfer unit configured to transfer the toner image formed on the electrostatic latent image bearer to a recording medium, a fixing unit configured to fix the transferred toner image on the recording medium, and other units (e.g., a charge-eliminating unit, a cleaning unit, a recycling unit, and a controlling unit). As the developer, the developer of the present disclosure is used.

An example of the process cartridge of the present disclosure is illustrated in FIG. 1. The process cartridge 100 includes a photoconductor 20, a charging unit 32 in the form of a brush that is disposed close to the photoconductor 20, a developing device 40 in which the developer of the present disclosure is stored, and a cleaning device including at least a cleaning blade 61 (a cleaning member), where the photoconductor 20, the charging unit 32, the developing device 40, and the cleaning device are designed as an integrated unit that is detachably mounted in a main body of an image forming apparatus. In the present disclosure, the above-mentioned constituent components are assembled together to form the process cartridge as an integrated unit, and the process cartridge is detachably mounted in a main body of an image forming apparatus, such as a photocopier and a printer.

The electrophotographic image forming apparatus of the present disclosure includes the predetermined developing unit (the predetermined developing device). The electrophotographic image forming method of the present disclosure uses the predetermined developing unit (the predetermined developing device).

The developing device includes a developer bearer and a developer-supplying transporting member, and satisfies the following condition (1) or (2).

In the above-described structure, the developer is configured to rotate with a two-component developer, which includes a carrier for electrophotographic image formation and a toner, borne on a surface of the developer to supply the toner to the electrostatic latent image bearer at a position where the developer bearer faces the electrostatic latent image bearer to perform developing.

In the above-described structure, the developer-supplying transporting member is configured to transport the two-component developer along an axial direction of the developer bearer to supply the two-component developer to the developer bearer to form a developer-supplying transportation path with the developer-supplying transporting member.

In the above-described structure, the carrier for electrophotographic image formation is the carrier of the present disclosure.

Since the above-described developing device and the carrier of the present disclosure are used in combination, deposition of the carrier on a non-imaging area, which may be caused by a long-term use of the carrier, can be further reduced.

[Condition (1)]

The developing device further includes the developer-stirring transporting member and a partitioning member.

Where an excess developer is the two-component developer that has not been used for developing and is transported to a downstream end of the developer-supplying transportation path relative to a transporting direction of the developer-supplying transportation path, the developer-stirring transporting member is configured to receive the excess developer to transport the excess developer along the axial direction of the developer bearer in a reverse direction to the direction in which the developer-supplying transporting member transports the two-component developer, while stirring the excess developer, to form a developer-stirring transportation path with the developer-stirring transporting member.

The developer-supplying transportation path and the developer-stirring transportation path are separated by the partitioning member across a central part in a longitudinal direction of the developer-supplying transportation path and the developer-stirring transportation path, the central part excluding both ends in the longitudinal direction.

The two-component developer borne on the developer bearer and passed through the position where the developer bearer faces the electrostatic latent image bearer is recovered into the developer-stirring transportation path, the recovered two-component developer is mixed with the excess developer transported via the developer-stirring transportation path, and the mixed developer is supplied from the downstream end of the developer-stirring transportation path to the developer-supplying transportation path.

[Condition (2)]

The developing device further includes a developer-recovering transporting member, a developer-stirring transporting member, and a partitioning member.

The developer-recovering transporting member is configured to recover the two-component developer that is borne on the developer bearer and has been passed through the position where the developer bearer faces the electrostatic latent image bearer, and to transport the recovered two-component developer along the axial direction of the developer bearer in the same direction as the direction in which the developer-supplying transporting member transports the two-component developer, to form a developer-recovering transportation path with the developer-recovering transporting member.

Where an excess developer is the two-component developer that has not been used for developing and is transported to a downstream end of the developer-supplying transportation path relative to the transportation direction of the developer-supplying transportation path, and a recovered developer is the two-component developer that is recovered by the developer-recovering transporting member, the developer-stirring transporting member is configured to receive the excess developer and the recovered developer to transport the excess developer and the recovered developer along the axial direction of the developer bearer in a reverse direction to the direction in which the developer-supplying transporting member transports the two-component developer, while stirring the excess developer and the recovered developer, to form a developer-stirring transportation path with the developer-stirring transporting member.

The developer-supplying transportation path, the developer-recovering transportation path, and the developer-stirring transportation path are separated from one another by the partitioning member.

Figure 2:
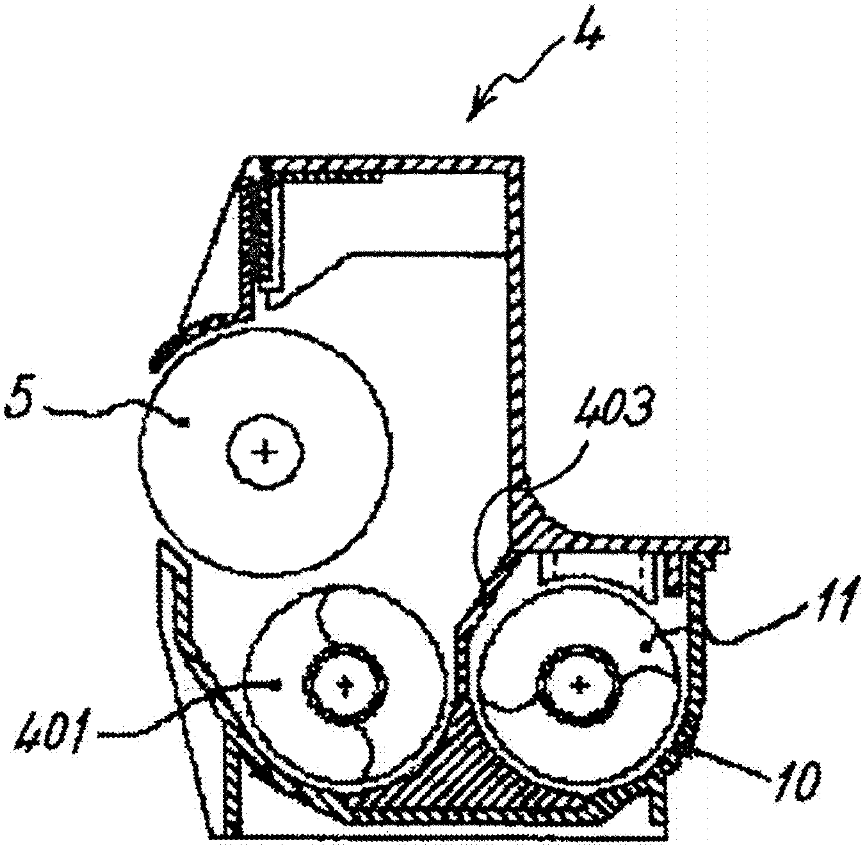
FIG. 2 is a view illustrating an example of a developing device where a developer-supplying transportation path and a developer-recovering transportation path are formed as a single common path.

The developing device 4 illustrated in FIG. 2 is an example of a developing device in which the developer of the present disclosure is stored. In the developing device 4, a transportation path for supplying the developer to a developing roller 5 serving as the developer bearer and a transportation path for stirring the developer are arranged separately, and the above-mentioned two transportation paths transport the developer in the opposite directions to circulate the developer.

The developing device 4 illustrated in FIG. 2 includes the developing roller 5, a first auger 401, a second auger 11, and a partitioning member 403. A developer-stirring transportation path 10 is formed between the second auger 11 and the partitioning member 403. Moreover, a developer-supplying transportation path is formed between the first auger 401 and the partitioning member 403. The first auger 401 and the second auger 11 are each in the shape of, for example, a screw, and are configured to transport the developer as the first auger 401 and the second auger 11 rotate.

In the developing device 4 illustrated in FIG. 2, the transportation path for supplying the developer to the developing roller 5 and the transportation path for recovering the developer that has been supplied to the developing roller 5 and has been passed through the developing region are the same single path. Specifically, the transportation path formed with the first auger 401 is used to supply and recover the developer. The developer-stirring transportation path 10 formed with the second auger 11 is used to stir the developer and to supply the developer to the supplying transportation path. Specifically, the developer is not recovered via the developer-stirring transportation path 10. Therefore, the developing device 4 illustrated in FIG. 2 does not satisfy the above-mentioned condition (1) nor (2), thus the developing device 4 is not the developing device of the present disclosure.

In the developing device 4 illustrated in FIG. 2, as described above, the transportation path for supplying the developer to the developing roller 5 and the transportation path for recovering the developer that has been supplied to the developing roller 5 and has been passed through the developing region are the same single path. Therefore, the toner concentration of the developer supplied to the developing roller 5 tends to decrease towards the downstream side of the transportation path for supplying the developing roller 5 relative to the transportation direction.

As the toner concentration in the developer supplied to the developing roller 5 decreases, an image density at the time of developing may be reduced. If the toner density is low, a probability of the toner particles being present between the carrier particles is reduced. Therefore, the speed of a resin coating layer (coating layer) of each carrier particle being peeled off due to the impacts or friction among the carrier particles is increased. Particularly in the case where diantimony pentoxide-containing particles are used as an electrical resistance regulator, deposition of the carrier on a non-imaging area tends to occur at a relatively early stage. Since the diantimony pentoxide-containing particles have a high electrical resistance regulation capability per unit volume, an increase rate of electrical resistance of the carrier tends to be high when the electrical resistance regulator is detached from the carrier particles due to scraping of the coating layer. Therefore, counter charge tends to be accumulated in the carrier when the carrier is used to charge a toner, which may cause deposition of the carrier in a non-imaging area at a relatively early stage.

Figure 3:
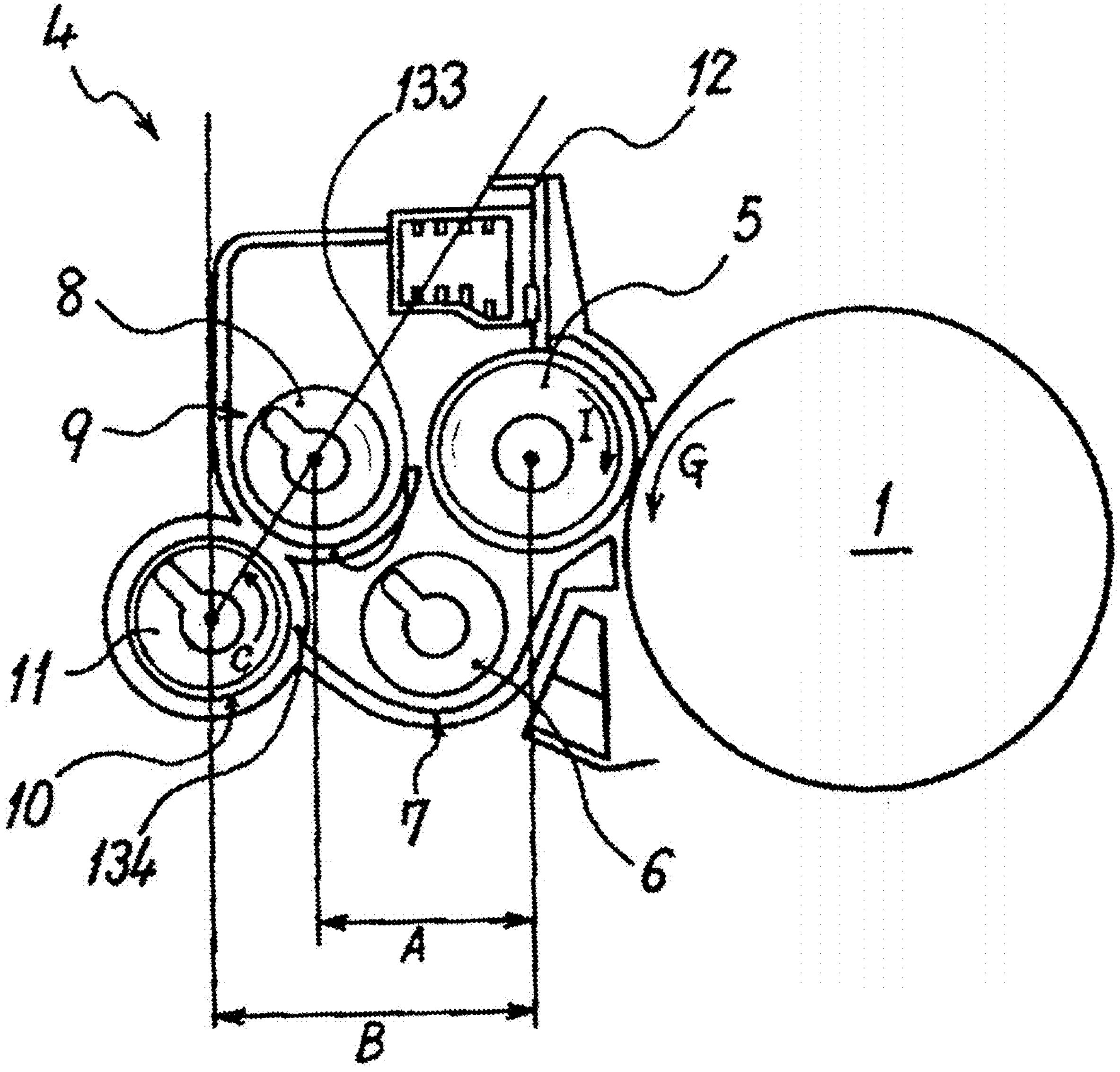
FIG. 3 is a view illustrating an example of a developing system where a developer-supplying transportation path, a developer-recovering transportation path, and a developer-stirring transportation path are separated by a partitioning member.
Figure 4:
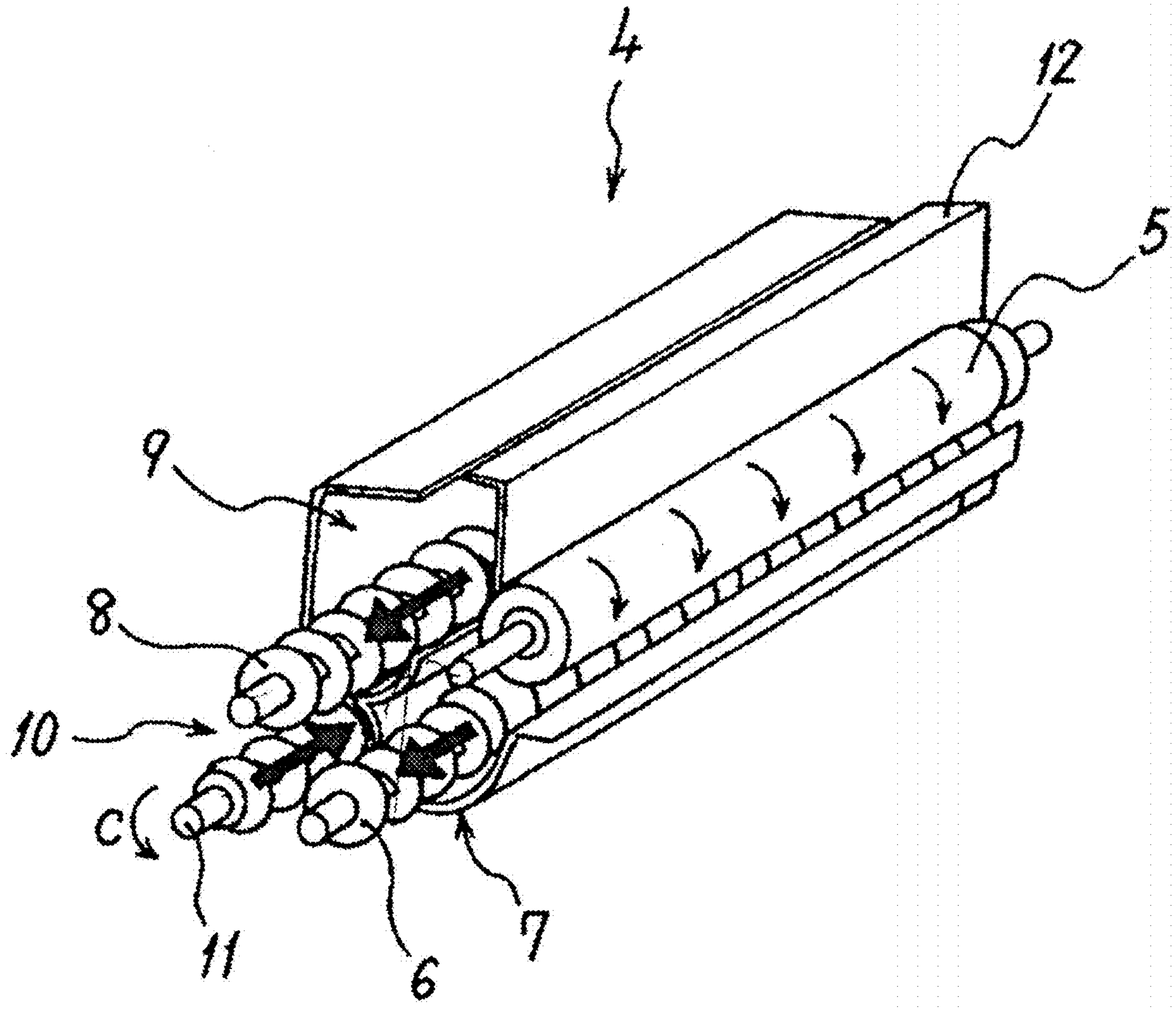
FIG. 4 is a diagram illustrating the flow of the developer via the developer transportation paths in the developing system of FIG. 3.

The developing device illustrated in FIG. 2 may be used in an image forming apparatus by which the electrophotographic image forming method of the present disclosure is performed, but the developing device illustrated in FIGS. 3 and 4 is preferably used. Use of the developing device illustrated in FIGS. 3 and 4 can minimize a possibility that carrier particles are rubbed against each other in a developing region in a state where a toner content in the developer is low. Therefore, a sharp rise of electrical resistance of the carrier can be suppressed, which reduces carrier deposition in a non-imaging area after using the developer for a long period.

Figure 5:
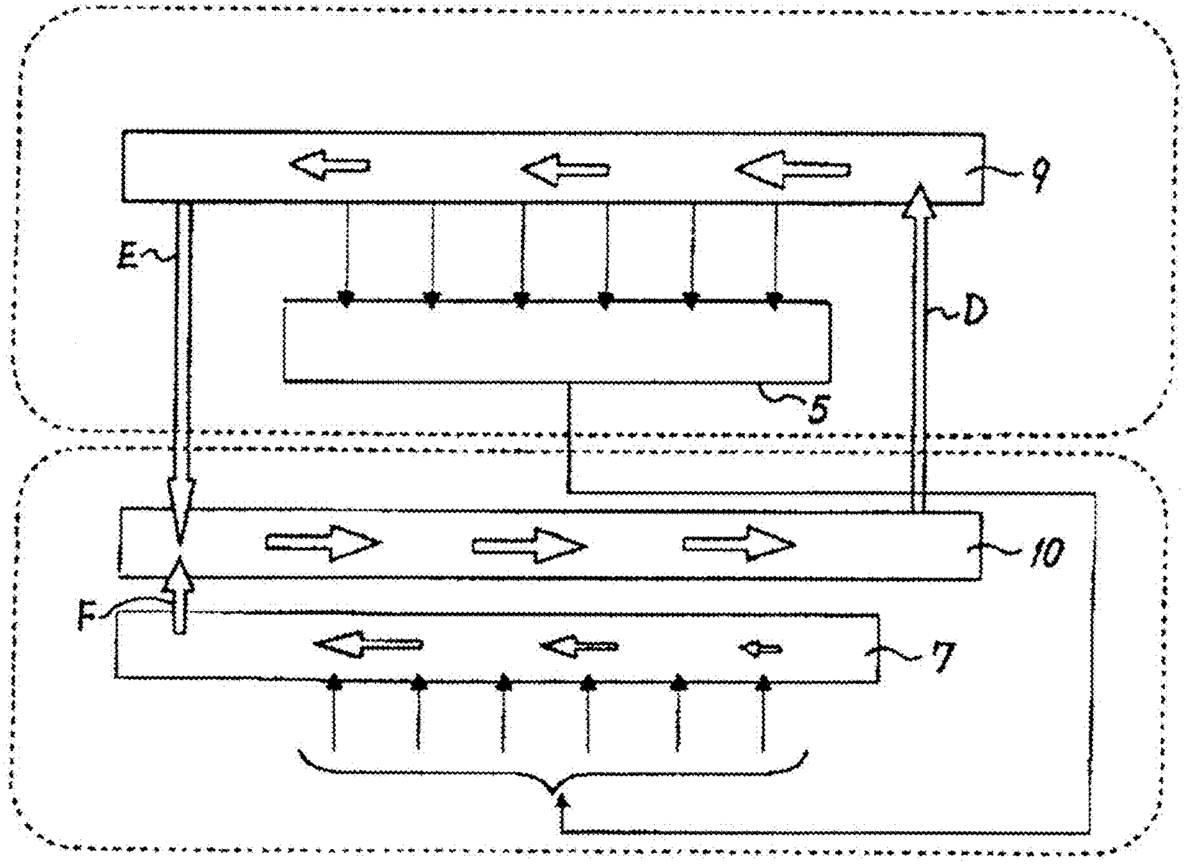
FIG. 5 is a schematic view illustrating the flow of the developer inside the developing system of FIG. 3.

FIG. 3 is an enlarged schematic view illustrating the developing device 4 and the photoconductor 1 of the present embodiment, and illustrates a preferred example of the developing device. FIG. 4 is a view illustrating a flow of the developer inside the developer transportation paths of the present embodiment, and a schematic perspective view of the developing device 4. In FIG. 4, each arrow schematically depicts the traveling direction of the developer. FIG. 5 is a view schematically illustrating a flow of the developer inside the developing device 4. In a similar manner as in FIG. 4, each arrow in FIG. 5 schematically depicts the traveling direction of the developer.

The example illustrated in FIGS. 3 to 5 is an example satisfying the condition (2), and is an example of the developing device of the present disclosure. The developing device 4 of the present embodiment includes a developing roller 5 and a supply screw 8 (a developer-supplying transporting member). The developing roller 5 is configured to rotate with the developer borne on the surface thereof, and is configured to supply the toner to the photoconductor 1 at the position where the developing roller 5 faces the photoconductor 1 to perform developing. The supply screw 8 is configured to transport the developer along the axial direction of the developing roller 5 to supply the developer to the developing roller 5. A supplying transportation path 9 (a developer-supplying transportation path) is formed with the supply screw 8.

The developing device 4 of the present embodiment satisfies the condition (2).

[Condition (2)]

The developing device 4 of the present embodiment further includes a recovery screw 6 (a developer-recovering transporting member), a stirring screw 11 (a developer-stirring transporting member), and a first partitioning wall 133 and a second partitioning wall 134 (partitioning members).

The recovery screw 6 recovers a developer that is borne on the developing roller 5 and has been passed through a position where the developing roller 5 faces the photoconductor 1, and transports the recovered developer along the axial direction of the developing roller 5 in the same direction as the direction in which the supply screw 8 transports the developer. The recovery screw 6 forms a developer-recovering transportation path 7 (a developer-recovering transportation path).

The developer that has not been used for developing and is transported to a downstream end of the developer-supplying transportation path 9 relative to the transportation direction of the developer-supplying transportation path 9 is regarded as an excess developer. The developer recovered by the recovery screw 6 and transported to the downstream end of the recovery developer-transportation path 7 relative to the transportation direction of the developer-recovering transportation path 7 is regarded as a recovered developer.

The stirring screw 11 receives the excess developer and the recovered developer to transport the excess developer and the recovered developer along the axial direction of the developing roller 5 in the reverse direction to the direction in which the supply screw 8 transports the developer, while stirring the excess developer and the recovered developer. The stirring screw 11 forms a developer-stirring transportation path 10 (a developer-stirring transportation path).

The supplying transportation path 9, the developer-recovering transportation path 7, and the stirring transportation path 10 are separated from one another by the first partitioning wall 133 or the second partitioning wall 134.

As illustrated in FIG. 3, a surface of the photoconductor 1 is charged by a charging device, while the photoconductor 1 is rotated in the direction indicated with the arrow G in FIG. 3. Laser light is emitted from an exposure device to the charged surface of the photoconductor 1 to form an electrostatic latent image. A toner is supplied from the developing device 4 to the electrostatic latent image to form a toner image. In FIG. 3, the charging device and the exposure device are not illustrated.

The developing device 4 includes a developing roller 5 serving as the developer bearer. The developing roller 5 is configured to supply the developer to the latent image on the surface of the photoconductor 1, while the surface of the developing roller 5 travels in the direction indicated with the arrow I in FIG. 3, to develop the latent image.

The developing device 4 includes a supply screw 8 serving as the developer-supplying transporting member. The supply screw 8 transports the developer, for example, towards the front end in FIG. 3, while supplying the developer to the developing roller 5.

The developing device 4 includes a developing doctor blade 12 serving as a developer regulation member. The developing doctor blade 12 is disposed to be extended from a position where the developing roller 5 and the supply screw 8 face each other to a position that is downstream of the surface-traveling direction (the direction indicated with the arrow I). The developing doctor blade 12 is configured to adjust the thickness of the developer supplied on the developing roller 5 to be a suitable thickness. For example, the developing doctor blade 12 formed of stainless steel may be used.

The developing device 4 includes a recovery screw 6 serving as the developer-recovering transporting member. The recovery screw 6 is disposed at a position that is downstream in the surface traveling direction (the direction indicated with the arrow I) relative to the position where the developing roller 5 faces the photoconductor 1 (also referred to as a developing region). The recovery screw 6 is configured to recover the consumed developer, which has passed through the developing region, and to transport the recovered developer in the same direction as the direction of the supply screw 8 (for example, the direction towards the front end in FIG. 4).

The developing device 4 includes a developer-supplying transportation path 9 and a developer-recovering transportation path 7. The supplying transportation path 9 is a developer-supplying transportation path in which a supply screw 8 is disposed. For example, the supplying transportation path 9 is positioned parallel to and next to the developing roller 5. The developer-recovering transportation path 7 is a developer-recovering transportation path in which a recovery screw 6 is disposed. For example, the developer-recovering transportation path 7 is positioned below the developing roller 5. As illustrated, the developer-supplying transportation path 9 and the developer-recovering transportation path 7 are disposed in parallel.

The developing device 4 includes a stirring transportation path 10 that is a developer-stirring transportation path. For example, the stirring transportation path 10 is positioned below the developer-supplying transportation path 9, and arranged parallel to the developer-recovering transportation path 7. The stirring transportation path 10 includes a stirring screw 11 serving as a developer-stirring transporting member. The stirring screw 11 is configured to transport the developer in the direction towards the back end in FIG. 4, while stirring the developer. The direction along which the stirring screw 11 transports the developer is the reverse direction to the direction in which the supply screw 8 transports the developer (i.e., the direction towards the front end in FIG. 4).

The developer-supplying transportation path 9 and the developer-stirring transportation path 10 are separated from each other with a first partitioning wall 133 serving as the partitioning member. The part of the first partitioning wall 133, by which the developer-supplying transportation path 9 and the developer-stirring transportation path 10 are separated, is open at the both ends that are the front end and the back end in FIG. 4. Therefore, the developer-supplying transportation path 9 and the developer-stirring transportation path 10 are linked together at the both ends that are the front end and the back end in FIG. 4.

The developer-supplying transportation path 9 and the developer-recovering transportation path 7 are also separated by the first partitioning wall 133, but the part of the first partitioning wall 133, by which the developer-supplying transportation path 9 and the developer-recovering transportation path 7 is separated, does not have any opening.

The developer-stirring transportation path 10 and the developer-recovering transportation path 7 are separated from each other by a second partitioning wall 134 serving as the partitioning member. The part of the second partitioning wall 134, by which the developer-stirring transportation path 10 and the developer-recovering transportation path 7 are separated, is open at the front end in FIG. 4. Therefore, the developer-stirring transportation path 10 and the developer-recovering transportation path 7 are linked together at the front end in FIG. 4.

As the supply screw 8, the recovery screw 6, and the stirring screw 11 serving as the developer transporting members, for example, resin screws may be used. Examples thereof include screws each having a diameter of 18 mm, a screw pitch of 25 mm, and screw speed of approximately 600 rpm.

The developing roller 5 transports the developer, which is formed into a thin layer by the developing doctor blade 12, to a developing region to perform developing. The developing region is a region where the developing roller 5 and the photoconductor 1 face each other. The section where the developing roller 5 faces the photoconductor 1 may be referred to as a counter part. The section of the developing roller 5 excluding the counter part may be referred to as a non-imaging region.

For example, the surface of the developing roller 5 may be treated to form V-shaped grooves in the surface, or may be subjected to sandblasting. Examples of the developing roller 5 include a developing roller formed with an aluminum (Al) pipe having a diameter of 25 mm where a gap between the developing doctor blade 12 and the photoconductor 1 is set to approximately 0.3 mm.

The residual developer after the developing is recovered via the developer-recovering transportation path 7 and is transported towards the front end in FIG. 4. The developer transported via the developer-recovering transportation path 7 is transferred into the stirring transportation path 10 via the opening of the second partitioning wall 134.

The developer-stirring transportation path 10 has a toner supply port at a position that is the upstream relative to the transportation direction of the developer (for example, the front end in FIG. 4). For example, the toner supply port is arranged near the opening of the first partitioning wall 133 in the developer-stirring transportation path 10. A toner is supplied from the toner supply port into the developer-stirring transportation path 10. The term "supply" may be interchangeably used with "replenish."

Next, the circulation of the developer via three developer transportation paths is described mainly with reference to FIG. 5.

The developer that is supplied to the developing roller 5 but is not used for developing may be referred to as an excess developer. The excess developer is transported via the supplying transportation path 9, and is supplied to the stirring transportation path 10 via the opening of the first partitioning wall 133 at the downstream relative to the transportation direction of the supplying transportation path 9 (the arrow E in FIG. 5).

The developer recovered from the developing roller 5 may be referred to as a recovered developer. The recovered developer is transported from the developing roller 5 to the developer-recovering transportation path 7, followed by being transported via the developer-recovering transportation path 7. Then, the developer is supplied into the developer-stirring transportation path 10 via the opening of the second partitioning wall 134 at the downstream relative to the transportation direction of the developer-recovering transportation path 7 (the arrow F in FIG. 5).

The supplied excessive developer and recovered developer are stirred in the developer-stirring transportation path 10. The developer inside the developer-stirring transportation path 10 is transported to the downstream relative to the transportation direction of the developer-stirring transportation path 10, i.e., the upstream relative to the transportation direction of the developer-supplying transportation path 9. Then, the developer is supplied into the supplying transportation path 9 via the opening of the first partitioning wall 133 (the arrow D in FIG. 5).

The recovered developer, the excess developer, and the toner replenished from the toner supply port as necessary are stirred and transported by the stirring screw 11 in the stirring transportation path 10. The direction in which the developer is transported in the stirring transportation path 10 is reverse to the transportation direction of the developer-recovering transportation path 7 and the transportation direction of the developer-supplying transportation path 9. The developer stirred and transported is transferred to the upstream of the developer-supplying transportation path 9 that is linked with the downstream of the developer-stirring transportation path 10.

A toner concentration sensor is disposed at the downstream of the developer-stirring transportation path 10. According to the output from the sensor, a toner-supply controlling device is operated. The toner-supply controlling device is configured to control toner supply from the toner storage unit to replenish the toner of the developer using the toner from the toner storage unit. The toner concentration sensor, the toner supply controlling device, and the toner storage unit are not illustrated in FIG. 5.

As described above, the developing device 4 of the present embodiment includes the developer-supplying transportation path 9 and the developer-recovering transportation path 7, and uses different transport paths for supplying and recovering the developer, respectively. Therefore, the recovered developer does not enter the developer-supplying transportation path 9. Owing to the structure as described, a toner concentration in a developer supplied to the developing roller 5 is not reduced even at the downstream side of the developer-supplying transportation path 9 relative to the transportation direction.

As described above, the developing device 4 of the present embodiments includes the developer-recovering transportation path 7 and the developer-stirring transportation path 10, and carries out recovery of the developer and stirring of the developer in different developer transportation paths. Therefore, the developer used for developing does not fall into a path where the developer is stirred. Therefore, the developer that is adequately stirred is supplied to the developer-supplying transportation path 9, which can minimize inadequate stirring for the developer supplied to the developer-supplying transportation path 9.

In the manner as described above, in the present embodiment, reduction in the toner concentration of the developer is minimized in the developer-supplying transportation path 9, and inadequate stirring of the developer in the developer-supplying transportation path 9 can be minimized, and therefore a consistent image density can be maintained during developing. Moreover, the predetermined effects can be exhibited even with the developer that is used over a long period of time.

Figure 6:
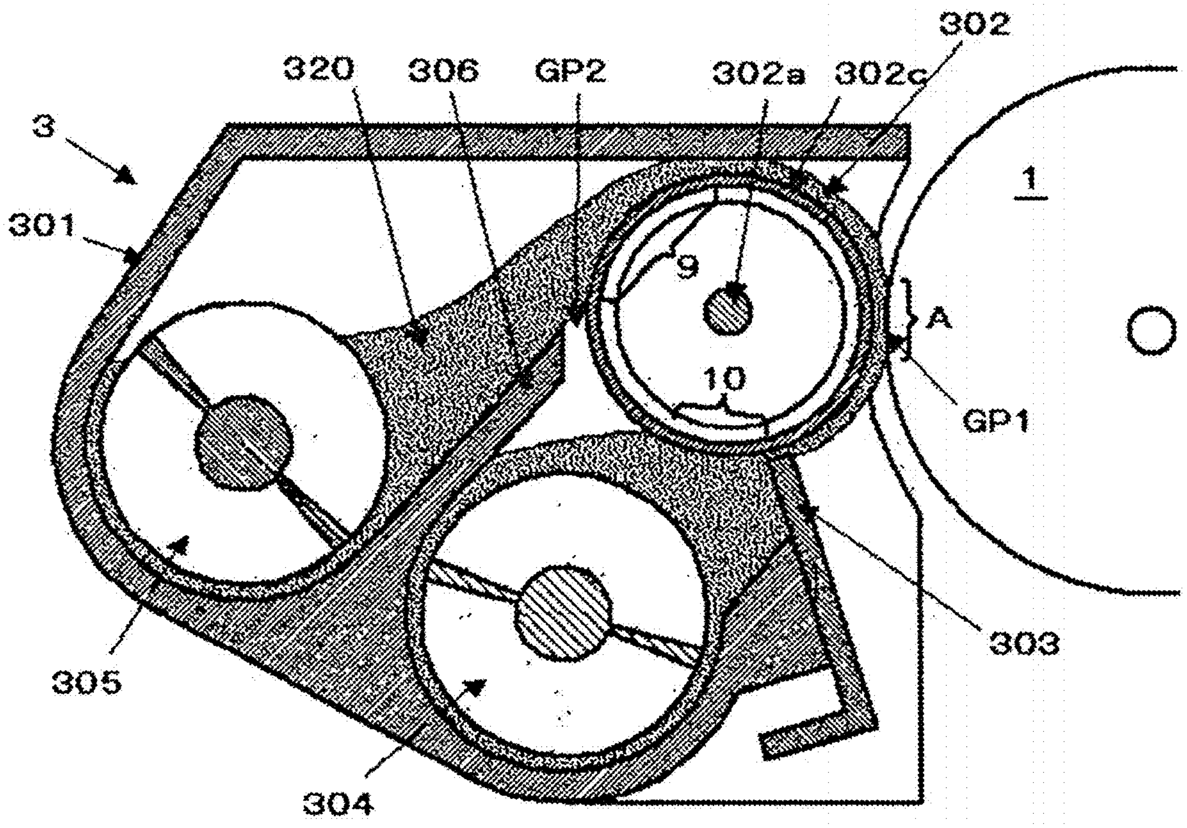
FIG. 6 is a schematic view illustrating members of a peripheral structure of a photoconductor where the photoconductor as an example of a latent image bearer is used in an image forming apparatus, and a developing device having a developer-supplying transportation path and a developer-stirring transportation path is used in the image forming apparatus.
Figure 7:
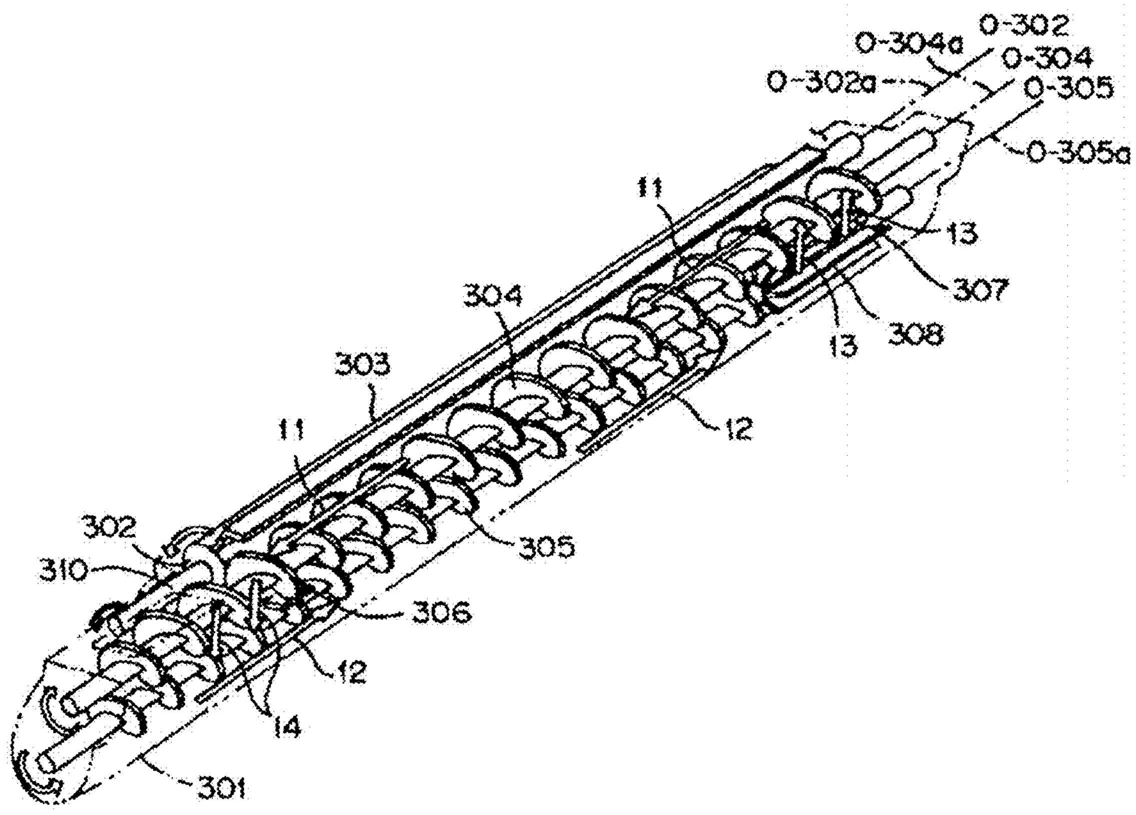
FIG. 7 is an assembled view illustrating an example of an inner structure of a developing device illustrating a relationship between a developer-supplying transporting member and a developer-stirring transporting member.
Figure 8:
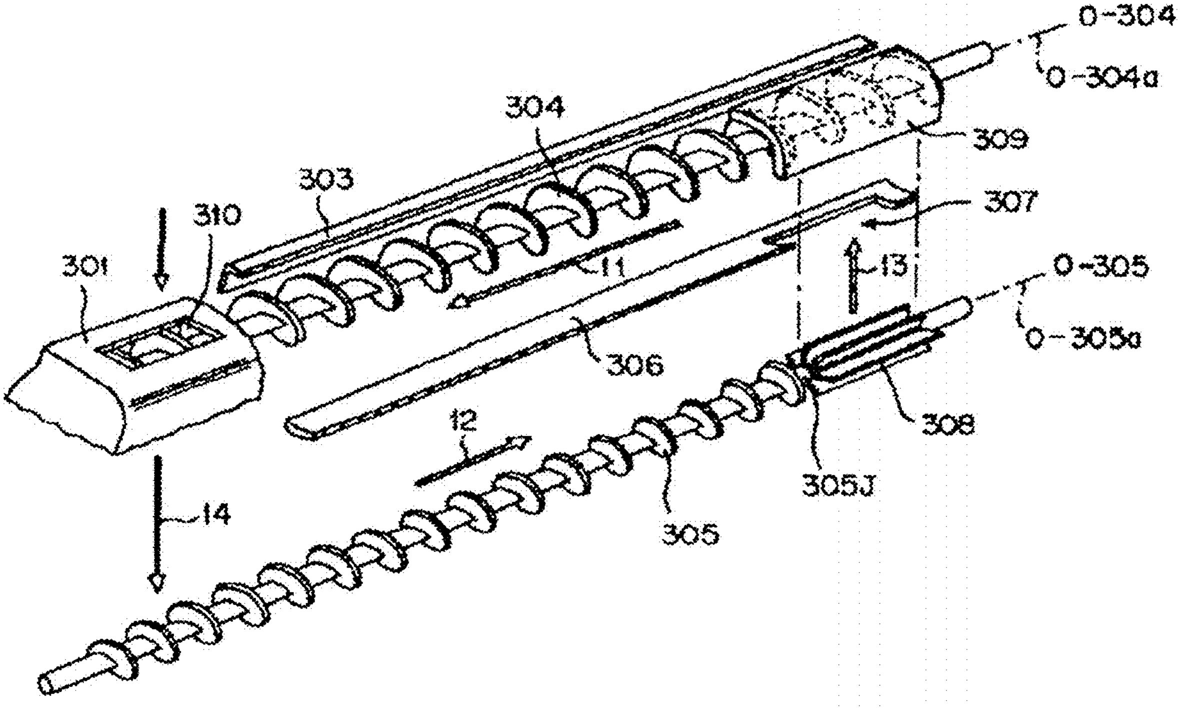
FIG. 8 is an exploded view illustrating an example of members constituting an inner structure of a developing device including a developer-supplying transporting member and a developer-stirring transporting member.

The example illustrated in FIGS. 6 to 8 is an example satisfying the above-described condition (1) and is an example of the developing device of the present disclosure. The developing device 3 of the present embodiment includes a developing roller 302, and a developer-supplying transporting member 304. The developing roller 302 rotates with the developer being borne on the surface of the developing roller 302 to supply a toner to a photoconductor 1 in a position where the developing roller 302 faces the photoconductor 1 to perform developing. The developer-supplying transporting member 304 transports the developer along the axial direction of the developing roller 302 to supply the developer to the developing roller 302. The developer-supplying transporting member 304 forms a developer-supplying transportation path.

The developing device 3 of the present embodiment satisfies the condition (1).

[Condition (1)]

The developing device 3 of the present embodiment includes a developer-stirring transporting member 305 and a partition board 306 (partitioning member).

When an excess developer is the two-component developer that has not been used for developing and is transported to a downstream end of the developer-supplying transportation path relative to a transporting direction of the developer-supplying transportation path, the developer-stirring transporting member 305 receives the excess developer to transport the excess developer along the axial direction of the developing roller 302 in a reverse direction to the direction in which the developer-supplying transporting member 304 transports a developer, while stirring the excess developer. The developer-stirring transporting member 305 forms a developer-stirring transportation path.

The developer-supplying transportation path and the developer-stirring transportation path are separated by the partition board 306 across a central part in the longitudinal direction of the developer-supplying transportation path and the developer-stirring transportation path where the central part excludes both ends.

The developer borne on the developing roller 302 and passed through the position where the developing roller 302 faces the photoconductor 1 is recovered into the developer-stirring transportation path, and the recovered developer is mixed with the excess developer transported via the developer-stirring transportation path. Then, the mixed developer is supplied from the downstream end of the developer-stirring transportation path to the developer-supplying transportation path.

FIG. 6 is a schematic view illustrating the peripheral structure of the photoconductor 1 in the present embodiment. The illustrated developing device 3 includes a developer-supplying transporting member 304, a developer-stirring transporting member 305, a developing roller 302, and other members inside a casing 301. The developer-supplying transporting member 304, the developer-stirring transporting member 305, and the developing roller 302 are rotatable members. The developer-supplying transporting member 304 stirs and transports the developer 320 via the developer-supplying transportation path. The developer-stirring transporting member 305 stirs and transports the developer 320 via the developer-stirring transportation path.

The developing device 3 includes the developing roller 302, the developer-supplying transporting member 304, the developer-stirring transporting member 305, and the developer regulation member 303 inside a casing 301. The developing device 3 stirs and transports the developer 320 to circulate the developer 320.

The length of the developing roller 302 along the longitudinal direction is substantially identical to the length of the photoconductor 1 along the longitudinal direction. The developing roller 302 is disposed closely to the photoconductor 1 to face the photoconductor 1 in a manner that a developing nip region A is formed. The part of the casing 301 corresponding to the region facing the photoconductor 1 is open to expose the developing roller 302.

The developer 320 inside the casing 301 is transported to the developing nip region A by the developing roller 302. The toner included in the developer 320 is deposited on the electrostatic latent image formed on the surface of the photoconductor 1 in the developing nip region A. In the manner as described, the electrostatic latent image is made visible as a toner image.

For example, the developing roller 302 includes a sleeve 302*c*, and a magnetic roller disposed inside the sleeve 302*c*. The numerical reference for the magnetic roller is omitted. For example, the sleeve 302*c* has a cylindrical shape, and is formed of a nonmagnetic metal, such as aluminium. For example, magnets are disposed along a circumferential direction of the magnetic roller. The magnet roller is fixed to a non-moving member (e.g., a casing 301) in a manner that each of the magnets faces the predetermined direction. As the sleeve 302*c* rotates, the developer 320 attracted by the magnets is transported on the sleeve 302*c*.

The developing roller 302 and the photoconductor 1 do not come directly in contact with each other at a developing nip A, but face each other with a developing gap GP1 left between the developing roller 302 and the photoconductor 1. The developing gap GP1 is the predetermined gap suitable for developing. In the developing device 3, the developer 320 is held on the developing roller 302 in the form of brush, and the developer 320 is brought into contact with the photoconductor 1 to deposit a toner on an electrostatic latent image on the surface of the photoconductor 1 to make the electrostatic latent image visible.

A fixed axis 302*a* is disposed inside the developing roller 302. A grounded power source VP (not illustrated) for bias is coupled to the fixed axis 302*a*. The voltage of the power source VP coupled to the fixed axis 302*a* is applied to the sleeve 302*c*. A conductive support (not illustrated) that is an under layer constituting the photoconductor 1 is grounded.

In the manner as described above, an electric field for transferring the toner detached from the carrier to the side of the photoconductor 1 is formed in the developing nip A. The toner is moved towards the photoconductor 1 due to a potential difference between the sleeve 302*c* and an electrostatic latent image formed on the surface of the photoconductor 1.

The developing device 3 of the present embodiment is used in combination with an image forming apparatus employing a system where information is written with exposure light. Specifically, the image forming apparatus employs a reverse developing system. In the reverse developing system, the photoconductor 1 is uniformly charged with negative polarity by a charging device; the sections of the photoconductor 1 corresponding to letters to be printed are exposed to exposure light to reduce the potential of the sections corresponding to the letters (an electrostatic latent image) for reducing the writing load; and, a toner charged with negative polarity is deposited on the exposed sections of the photoconductor 1 to develop the electrostatic latent image. The above-described developing system is merely an example. The polarity of charge applied to the photoconductor 1 may be appropriately selected among the developing systems employed for the present disclosure.

After developing, the developer 320 borne on the developing roller 302 is transported to the downstream as the developing roller 302 is rotated, and then is guided into the casing 301. Part of the casing 301 is curved to be close to and to match with the circumferential surface of the sleeve 302*c*. The curvature of the casing 301 contributes to prevent toner scattering due to a sealing effect.

The force for detaching the developer 320 attracted to the developing roller 302 from the developing roller 302 (the force for developer release) is applied to the developer guided into the casing 301. For the developer release, a developer releasing region 9 is formed.

The developer 320 after being used for depositing the toner on the photoconductor 1 has a reduced toner concentration. Therefore, an intended image density may not be achieved, if the developer having the reduced toner concentration is transported again to the developing nip A without detaching from the developing roller 302 and is supplied for developing.

In order to reduce the possibility for a defect associated with use of the developer having the reduced toner concentration, the developer is detached from the developing roller 302 in the developer release region 9 after the developing. The developer detached from the developing roller 302 is then adequately stirred to regain the intended toner concentration and charge of the toner inside the casing 301.

The developer that has regained the intended toner concentration and charge of the toner is drawn up on the developing roller 302 in a developer drawing region 10 on the developing roller 302. The expression "drawn up" may be referred to as "attracted to." The developer drawn up on the developing roller 302 is leveled to have a predetermined thickness by passing through a developer regulation member 303, and is transported to the developing nip A with the developer held in the form of a magnetic brush.

The arrangement of each member will be described below optionally with reference to FIG. 7 illustrating an inner structure of the developing device as an assembled view, and FIG. 8 illustrating the inner structure as an exploded view.

As illustrated in FIG. 6, the developer-supplying transporting member 304 is disposed near the developer drawing up region 10 at the periphery of the developing roller 302. The developer-supplying transporting member 304 is positioned at the upstream of the developer regulation member 303 relative to the rotational direction of the developing roller 302.

As illustrated in FIGS. 7 and 8, for example, the developer-supplying transporting member 304 is a rotational shaft around which a spiral screw is provided. The developer-supplying transporting member 304 rotates with a center line O-304*a* as a center. The center line O-304*a* is parallel to a center line O-302*a* passing through a center O-302 of the developing roller 302. The developer-supplying transporting member 304 transports the developer from the back end to the front end relative to the longitudinal direction of the center line O-304*a* in the direction indicated with the white arrow 11, while stirring the developer. Specifically, the developer-supplying transporting member 304 transports the developer along the axial direction of the developer-supplying transporting member 304 owing to rotation of the rotational shaft of the developer-supplying transporting member 304.

As illustrated in FIG. 6, the developer-stirring transporting member 305 is disposed near the developer release region 9 at the periphery of the developing roller 302. As illustrated in FIGS. 7 and 8, the developer-stirring transporting member 305 is a rotational shaft around which a spiral screw is disposed. The developer-stirring transporting member 305 rotates with a center line O-305*a* as a center. The center line O-305*a* is parallel to a center line O-302*a* passing through a center O-302 of the developing roller 302. The developer-stirring transporting member 305 transports the developer from the front end to the back end relative to the longitudinal direction of the center line O-305*a* in the direction indicated with the white arrow 12, while stirring the developer. Specifically, the developer-stirring transporting member 305 transports the developer in the direction reverse to the transportation direction of the developer-supplying transporting member 304 owing to the rotation of the rotational shaft of the developer-stirring transporting member 305. In FIGS. 7 and 8, the "back end" is the right end of the drawing, and the "front end" is the left end of the drawing.

As illustrated, the developer-stirring transporting member 305 is preferably arranged in the position that is upper diagonal relative to the developer-supplying transporting member 304. As illustrated, moreover, the space surrounding the developer-supplying transporting member 304 and the space surrounding the developer-stirring transporting member 305 are preferably adjacent to one another inside the casing 301.

The back end of the developer-supplying transporting member 304 and the back end of the developer-stirring transporting member 305 are preferably set to be slightly farther back relative to the back end of the developing roller 302. Owing to the structure as described, supply of the developer can be assured at the back end of the developing roller 302.

Moreover, the front end of the developer-supplying transporting member 304 and the front end of the developer-stirring transporting member 305 are set to be slightly nearer than the front end of the developing roller 302. Specifically, the front end of the developer-supplying transporting member 304 and the front end of the developer-stirring transporting member 305 are projected from the front end of the developing roller 302. Owing to the structure as described, the adequate space for supplying the toner can be assured. Moreover, the developer regulation member 303 is disposed to match the length of the developing roller 302.

The developing device 3 includes the partition board 306. The partition board 306 blocks the space surrounding the developer-supplying transporting member 304 from the space surrounding the developer-stirring transporting member 305 and vice versa. The partition board 306 is formed in a manner that one end of the partition board 306 is supported by the far side of the inner wall of the casing 301 relative to the developing roller 302 to form an integrated body.

The partition board 306 is disposed between the developer-supplying transporting member 304 and the developer-stirring transporting member 305 at a center area excluding the both ends relative to the longitudinal direction of the developing roller 302. Specifically, the partition board 306 is located in a position corresponding to the central part of the developing roller 302 excluding the both ends of the developing roller 302 relative to the longitudinal direction of the developing roller 302; the partition board 306 is not present at the positions corresponding to the both ends of the developing roller 302 relative to the longitudinal direction of the developing roller 302.

Meanwhile, the both ends of the developer-supplying transporting member 304 and the both ends of the developer-stirring transporting member 305 relative to the longitudinal direction thereof are extended to the both ends of the developing roller 302 relative to the longitudinal direction of the developing roller 302.

The developer transported by the developer-stirring transporting member 305 in the direction indicated with the white arrow 12 is stopped by the side wall of the casing 301 at the end of the transportation direction. As a result, as indicated with the white arrow 13, the developer is transferred along the side wall of the casing 301 towards the developer-supplying transportation path in which the developer-supplying transporting member 304 is disposed.

Similarly, the developer transported in the direction indicated with the white arrow 11 by the developer-supplying transporting member 304 is stopped by the side wall of the casing 301 at the end of the transportation direction. As a result, as indicated with the white arrow 14, the developer is transferred along the side wall of the casing 301 towards the developer-stirring transportation path in which the developer-stirring transporting member 305 is disposed.

The partition board 306 is disposed in a position corresponding to only a central part of the developing roller 302 relative to the longitudinal direction of the developing roller 302 excluding the both ends of the developing roller 302 relative to the longitudinal direction so that the flow of the developer as indicated by the white arrows 13 and 14 at the ends relative to the longitudinal direction is achieved. As a result, the entire circulation transportation path indicated with the white arrows 11, 14, 12, and 13 is formed.

In the illustrated embodiment, an opening 307 is formed at the edge at the back end of the partition board 306. In the embodiment, the developer is transferred from the developer-stirring transportation path to the developer-supplying transportation path via the opening 307. Therefore, the shape of the partition board 306 may be appropriately selected. The partition board 306 may have a structure where the partition board 306 reaches the position corresponding to the back end of the developing roller 302 relative to the longitudinal direction of the developing roller 302.

As described above, the developing device 3 of the present embodiments is constructed to include the developing roller 302, the developer-supplying transporting member 304, the developer-stirring transporting member 305, and the partition board 306.

The developing roller 302 rotates with the developer borne on the surface of the developing roller 302, and is configured to develop an electrostatic latent image formed on the photoconductor 1 with the developer to form a visible image.

The developer-supplying transporting member 304 is disposed closely to a developer-drawing up region 10 where the developer is drawn up to the developing roller 302. Moreover, the developer-supplying transporting member 304 rotates around a center line O-304*a* as a center, where the center line O-304*a* is parallel to the center line O-302*a* of the developing roller 302. The developer-supplying transporting member 304 transports developer along the longitudinal direction of the center line O-304*a* while stirring the developer.

The developer-stirring transporting member 305 is disposed closely to the developer release region 9 where the developer is detached from the developing roller 302. Moreover, the developer-stirring transporting member 305 rotates around a center line 305*a* as a center, where the center line 305*a* is parallel to the center line 302*a* of the developing roller 302. The developer-stirring transporting member 305 transports the developer in the reverse direction to the direction in which the developer-supplying transporting member 304 transports the developer, while stirring the developer.

The partition board 306 is disposed between the developer-supplying transporting member 304 and the developer-stirring transporting member 305 at a position corresponding to a central part of the developing roller 302 excluding the both ends of the developing roller 302 relative to the longitudinal direction of the developing roller 302 inside the developing device 3, i.e., the casing, to block the developer-supplying transportation path from the developer-stirring transportation path and vice versa.

In the developing device 3 of the present embodiment, the developer-supplying transporting member 304 and the developer-stirring transporting member 305, which constitute the circulated transportation path along the white arrows 11, 14, 12, and 13, are aligned side by side to face the developing roller 302 inside the casing 301.

Since the developing device has the above-described structure, the size of the developing device of the present embodiment can be made small with respect to the width (horizontal direction) compared to the developing device illustrated in FIG. 2 in which two stirring transportation members are arranged along the direction moving away from the developing roller (horizontal direction).

In the developing device 3 the size of which is reduced with respect to the horizontal direction as described above, moreover, the space surrounding the developer-supplying transporting member 304 is blocked from the space surrounding the developer-stirring transporting member 305 with the partition board 306 at the position corresponding to the central part excluding the both ends of the developing roller 302 relative to the longitudinal direction of the developing roller 302. To the developing roller 302, therefore, the developer 320 in which the toner and the carrier are adequately stirred and mixed by the developer-supplying transporting member 304 is supplied. The developer that has the lower toner concentration just after being used for developing is only stirred and transported by the developer-stirring transporting member 305, and is not supplied to the developing roller 302 straight away. Therefore, only the toner having the intended charge is supplied to the developing roller 302 for developing, leading to formation of high-quality images.

The partition board 306 supports the developer 320 stirred and transported by the developer-supplying transporting member 304 to form a developer transportation path. Moreover, the developer, which is detached from the developing roller 302 in the developer release region 9 at the upstream of the partitioning member 306 relative to the transportation direction and is stirred and transported by the developer-stirring transporting member 305, is stopped by the partition board 306 from being attracted to the developing roller 302 again and is guided into the space where the developer is stirred by the developer-supplying transporting member 304.

To ensure the above-described function, a gap between the outer edge of the developing roller 302 and the partition board 306, i.e., a partition board gap GP2, is preferably set in a range of 0.2 mm to 1 mm. When the partition board gap GP2 is less than 0.2 mm, the partition board 306 may be bumped into the developing roller 302 due to eccentricity of the rotation of the developing roller 302. The partition board gap GP2 being greater than 1 mm may cause inadequate removal of the magnetic brush. As the partition board gap GP2 is set in the above-described range, intended functions can be adequately obtained even when the partition board 306 is set in an arbitrary position within the developer release region 9. Namely, a design margin for setting a position of the partition board increases.

Moreover, the partition board 306 can also exhibit the intended functions even when the partition board 306 is set outside the developer release region 9. In the case where the partition board 306 is set outside the developer release region 9, however, the partition board may need to regulate a large amount of the developer, which increases stress the developer receives. Therefore, to set the partition board 306 in the above-described position is not preferable.

In the above-described case, the following embodiment is preferred. The developer release region 9 is located at the opposite side of the periphery of the developing roller 302 to the photoconductor 1 with the developing roller 302 being disposed between the photoconductor 1 and the developer release region 9. The developer drawing up region 10 is located in a position that is close to the downstream of the developer release region 9 along the rotational direction of the developing roller. Moreover, the partition board 306 is disposed at the position where an amount of the developer deposited on the surrounding area of the developing roller 302 is the minimum between the developer release region 9 and the developer drawing up region 10 in a manner that the space of the developer-supplying transportation path is blocked from the space of the developer-stirring transportation path. In addition, the partition board 306 is arranged in a manner that the edge of the partition board 306 at the side of the developing roller 302 faces the developing roller 302.

With the above-described structure, the intended functions of the partition board 306 can be exhibited without setting the partition board gap GP2 in the range of 0.2 mm to 1 mm, because the partition board 306 is located where an amount of the developer depositing to the surrounding area of the developing roller 302 is the minimum. Since the movement of the developer 320 is regulated to the predetermined region by the partition board 306, stress applied to the developer 320 is reduced to the minimum. Specifically, control of a gap is relaxed during setting of the partition board. In addition to the above-described structure, the partition board gap GP2 may be set in the range of 0.2 mm to 1 mm to further reduce the stress applied to the developer.

As illustrated in FIGS. 7 and 8, the developer-stirring transporting member 305 transports the developer 320 detached from the developing roller 302 towards the back end of the developing device 3 in the direction indicated with the white arrow 12, while stirring the developer 320. As illustrated in FIGS. 7 and 8, an opening 307 is formed at parts of the partition board 306 that are positions corresponding to the downstream of the developer-stirring transportation path relative to the transportation direction, and the back end of the developing device 3, respectively. Therefore, the developer 320 transported by the developer-stirring transporting member 305 is transferred into the developer-supplying transportation path in the direction indicated with the white arrow 13.

As illustrated in FIG. 8, instead of the screw, an impeller 308 may be disposed within the range corresponding to the opening 307 at the downstream of the direction of the developer transported by the developer-stirring transporting member 305. The impeller 308 is a member having a plurality of blades each extended in the form of a plate in the direction normal to the shaft core (center line O-305*a*) of the shaft 305J of the developer-stirring transporting member 305. The impeller 308 is configured to make the developer 320 jump by the rotation of the impeller 308.

The center O-304 of the developer-supplying transporting member 304 and the center O-305 of the developer-stirring transporting member 305 are arranged on the substantially same vertical line. As the impeller 308 is rotated, the developer 320 jumps against the inner wall of the casing 301. The opening 307 is preferably formed to extend from the position slightly closer to the inner wall of the casing 301 than the substantial vertical line connecting between the center O-304 and the center O-305 to the inner wall of the casing 301 so as not to block the traveling path of the developer by the above-described jump.

The rotational direction of the developer-supplying transporting member 304 is preferably set in the reverse direction to the rotational direction of the developing roller 302. Generally, a screw functions to draw a transportation subject in the rotational direction while transporting the transportation subject along the axial direction. Therefore, the developer-supplying transporting member 304 transports the developer 320 via the developer-supplying transportation path while drawing the developer 320 against the developing roller 302. Accordingly, the developer can be continuously supplied to the developing roller 302.

Meanwhile, the rotational direction of the developer-stirring transporting member 305 is preferably set in the same direction as the rotational direction of the developing roller 302. In the case where the developer-stirring transporting member 305 is rotated in the direction same as the rotational direction of the developing roller 302, the developer 320 is transported while the developer 320 is drawn away from the developing roller 302. Therefore, the developer once detached from the developing roller 302 in the developer release region 9 by magnetic force or the partition board 306 is stopped from being redeposited on the developing roller 302. Therefore, the developer having the reduced toner concentration after developing is stopped from being transported into the region of the developer-supplying transporting member 304.

The developer 320 inside the developing device 3 consumes the toner as a developing process is repeated. Therefore, the developer inside the developing device 3 is replenished with a toner supplied from outside the developing device, as necessary. For example, a toner is externally replenished from the upstream end of the developer-stirring transportation path arranged near the developer release region 9, i.e., a developer replenishment port disposed near the front end of the developing device. As a result, the replenished toner is not provided to the developer straight away, and is stirred with the developer in the developer-stirring transporting member 305 to stably provide the developer having the predetermined toner concentration for developing.

The developer-stirring transportation path is used only for recovering the developer 320 detached from the developing roller 302, and is not used for supplying a toner to the developing roller 302. Therefore, the developer, which is not adequately stirred with the toner from the replenishment port 310, thereby having the uneven toner concentration, is not provided for developing.

The replenished toner is transported towards the back end of the developing device 3 while being stirred and mixed with the developer 320 that is detached from the developing roller 302 and has the reduced toner concentration. By the time the developer is transported to the back end of the developing device 3, the toner concentration in the developer is returned to the regular level. Then, the developer is supplied to the developing roller 302 and is used for developing, while being transported towards the front end of the developer-supplying transporting member 304.

In the developing device 3 of the present embodiment, the developer 320 transported by the developer-supplying transporting member 304 is transported towards the front end and drawn up to the developing roller 302. The developer 320 drawn up on the developing roller 302 is brought into contact with the photoconductor 1 through use of the magnetic brush and is provided for developing. Thereafter, the developer 320 is detached from the developing roller 302 in the developer release region 9 inside the developing device 3, and then is transported towards the back end by the developer-stirring transporting member 305.

The above-described circulation path of the developer is as illustrated with the white arrows 11, 14, 12, and 13 in FIGS. 7 and 8. Along such a developer circulation path, the developer 320 is used for developing before being transported to the front end by the developer-supplying transporting member 304. Therefore, an amount of the developer returned to the back end by the developer-stirring transporting member 305 increases, and the developer 320 tends to be accumulated at the back end. If the accumulated developer is left as it is, smooth circulation of the developer may be inhibited.

Considering a possible problem associated with the accumulated developer, it is preferred that the developer transportation capability of the developer-supplying transporting member 304 be set greater than the developer transportation capability of the developer-stirring transporting member 305, and the amount of the developer transported by the developer-supplying transporting member 304 per unit time be set greater than the amount of the developer transported by the developer-stirring transporting member 305 per unit time. As a result, the transportation of the developer at the back end can be adjusted with the desired balance, and the smooth circulation of the developer can be maintained over a long period.

To achieve the above-described adjustments, for example, the developer transportation capability of the developer-stirring transporting member 305 can be improved by setting the outer diameter of the screw of the developer-supplying transporting member 304 greater than the outer diameter of the developer-stirring transporting member 305. The above-described adjustments can be also achieved by increasing the spiral pitch of the screw of the developer-supplying transporting member 304, increasing the screw speed, or increasing the space of the developer transportation path for the developer-supplying transporting member 304, and the same effects can be attained.

EXAMPLES

The present disclosure will be concretely described below by way of Examples. The present disclosure should not be construed as being limited to these Examples. Moreover, “part(s)” denotes “part (s) by mass” and “A” denotes “A by mass” unless otherwise stated.

Production of Toner

Synthesis Example 1 of Binder Resin

A reaction chamber equipped with a cooling tube, a stirrer, and a nitrogen-inlet tube was charged with 724 parts of a bisphenol A ethylene oxide (2 mol) adduct, 276 parts of isophthalic acid, and 2 parts by mass of dibutyl tin oxide, and the resulting mixture was allowed to react for 8 hours at 230° C. under ambient pressure, followed by reacting for 5 hours at reduced pressure of from 10 mmHg to 15 mmHg. Thereafter, the obtained reaction solution was cooled down to 160° C. To the cooled reaction solution, 32 parts of phthalic acid anhydride was added and the mixture was allowed to react for 2 hours.

The obtained reaction solution was cooled down to 80° C. The cooled reaction solution was allowed to react with 188 parts of isophorone diisocyanate in ethyl acetate for 2 hours, to thereby yield an isocyanate-containing prepolymer (P1).

Subsequently, 267 parts of the prepolymer (P1) and 14 parts of isophorone diamine were allowed to react for 2 hours at 50° C., to thereby yield a urea-modified polyester (U1) having a weight average molecular weight of 64,000.

In the similar manner as described above, 724 parts of a bisphenol A ethylene oxide (2 mol) adduct and 276 parts of terephthalic acid were allowed to react through a polycondensation reaction for 8 hours at 230° C. under ambient pressure, followed by reacting for 5 hours under the reduced pressure of from 10 mmHg to 15 mmHg, to thereby yield an unmodified polyester (E-1) having a peak molecular weight of 5,000. In 2,000 parts of an ethyl acetate/MEK (1/1) mixed solvent, 200 parts of the urea-modified polyester (U1) and 800 parts of the unmodified polyester(E1) were dissolved and mixed, to thereby yield a binder resin (B1) ethyl acetate/MEK solution. Part of the obtained solution was vacuum dried to separate a binder resin (B1).

Synthesis Example of Polyester Resin A

Terephthalic acid: 60 parts
Dodecenylsuccinic anhydride: 25 parts
Trimellitic anhydride: 15 parts
Bisphenol A (2,2) propylene oxide: 70 parts
Bisphenol A (2,2) ethylene oxide: 50 parts The above-listed ingredients were added to a 1 L four-necked boiling flask equipped with a thermometer, a stirrer, a condenser, and a nitrogen-inlet tube. The flask was set in a heating mantle, and the contents of the flask were heated while introducing nitrogen gas via the nitrogen-inlet tube to maintain the internal atmosphere of the flask as an inert atmosphere. Subsequently, 0.05 g of dibutyl tin oxide was added, and the resulting mixture was allowed to react while the temperature of the reaction system was maintained at 200° C., to thereby yield Polyester Resin A.

Production Example 1 of Master Batch

Pigment (C.I. Pigment Yellow 155): 40 parts
Binder resin (Polyester Resin A): 60 parts
Water: 30 parts The above-listed ingredients were mixed by Henschel Mixer to obtain a mixture, in which water was penetrated into pigment aggregates. The obtained mixture was kneaded for 45 minutes by a twin-roll kneader having a roll-surface temperature of 130'C, and the kneaded product was pulverized into particles each having a diameter of approximately 1 mm, to thereby prepare a master batch (M1).

Production Example of Toner A

A beaker was charged with 240 parts of the binder resin (B1) ethyl acetate/MEK solution, 20 parts of pentaerthritol tetrabehenate (melting point: 81° C., melt viscosity: 25 cps), and 8 parts of the master batch (M1). The resulting mixture was stirred at 60° C. by TK Homomixer at 12,000 rpm to homogeneously dissolve and disperse to thereby prepare a toner material solution.

A beaker was charged with 706 parts of ion-exchanged water, 294 parts of a 10% hydroxyapatite suspension (Supertite 10, available from Nippon Chemical Industrial Co., Ltd.), and 0.2 parts by mass of sodium dodecylbenzene sulfonate, and the resulting mixture was homogeneously dissolved.

Subsequently, the obtained solution was heated to 60° C., followed by adding the toner material solution to the solution while stirring the mixture at 12,000 rpm with the TK Homomixer. The resulting mixture was stirred for 10 minutes.

The obtained mixture was transferred into a flask equipped with a stirring rod and a thermometer. Then, the mixture was heated up to 98° C. to remove the solvent, followed by filtration, washing, drying, and air classification, to thereby obtain toner base particles A.

To 100 parts of the toner base particles A, 1.0 parts of hydrophobic silica and 1.0 parts of hydrophobic titanium oxide were added, and the resulting mixture was mixed by Henschel Mixer, to thereby obtain Toner A.

Particle diameters of the particles of Toner A was measured by a particle size analyzer (Coulter Counter TA2, available from Beckman Coulter, Inc.) with an aperture diameter of 100 μm. As a result, Toner A had a volume average particle diameter (Dv) of 6.2 μm and a number average particle diameter (Dn) of 5.1 μm.

Production of Carrier

Carrier Production Example 1

<Core Particles 1>
Mn—Mg—Sr ferrite (average particle diameter: 36 μm)
<Coat Liquid 1>
Acrylic resin solution (solid content: 20% by mass): 200 parts by mass
Silicone resin solution (solid content: 40, by mass): 2,000 parts by mass
Amino silane (solid content: 100, by mass): 30 parts by mass
Particles 1 (diantimony pentoxide): 1,200 parts by mass
Toluene: 6,000 parts by mass The above-listed materials of Coating Liquid 1 were blended together and mixed by a homomixer for 10 minutes to prepare a coating layer forming liquid.

The coating layer forming liquid prepared as Coating Liquid 1 was applied to Core Particles 1 by SPIRA COTA (available from OKADA SEIKO CO., LTD.) at a coating rate of 30 g/min in the atmosphere of 55° C. so that an average thickness of the coating layer on each of Core Particles 1 was to be 0.6 μm, followed by drying. The thickness of the coating layer was adjusted by adjusting the amount of Coating Liquid 1 to be applied. The obtained coated carrier particles were left to stand in an electric furnace for 1 hour at 150° C. to bake the carrier particles. After cooling the baked carrier particles, the carrier particles were crushed using a sieve having an opening size of 100 μm to thereby obtain Carrier 1.

Carrier Production Example 2

<: Coating Liquid 2>
Acrylic resin solution (solid content: 20% by mass): 200 parts by mass
Silicone resin solution (solid content: 40% by mass) 2,000 parts by mass
Amino silane (solid content: 100% by mass): 30 parts by mass
Particles 1 (carbon black): 50 parts by mass
Toluene: 6,000 parts by mass Carrier 2 was obtained in the same manner as in Carrier Production Example 1, except that the coating layer forming liquid was replaced with Coating Liquid 2.

Carrier Production Example 3

<Coating Liquid 3>

Acrylic resin solution (solid content: 20% by mass): 200 parts by mass

Silicone resin solution (solid content: 40% by mass) 2,000 parts by mass

Amino silane (solid content: 100% by mass): 30 parts by mass

Particles 1 (diantimony pentoxide-doped tin oxide): 1,200 parts by mass

Toluene: 6,000 parts by mass

Carrier 3 was obtained in the same manner as in Carrier Production Example 1, except that the coating layer forming liquid was replaced with Coating Liquid 3.

Carrier Production Example 4

<Coating Liquid 4>

Acrylic resin solution (solid content: 20% by mass): 200 parts by mass

Silicone resin solution (solid content: 40% by mass) 2,000 parts by mass

Amino silane (solid content: 100% by mass): 30 parts by mass

Particles 1 (diantimony trioxide-doped tin oxide): 1,200 parts by mass

Toluene: 6,000 parts by mass

Carrier 4 was obtained in the same manner as in Carrier Production Example 1, except that the coating layer forming liquid was replaced with Coating Liquid 4.

Carrier Production Example 5

<Coating Liquid 5>

Acrylic resin solution (solid content: 20% by mass): 200 parts by mass

Silicone resin solution (solid content: 40% by mass) 2,000 parts by mass

Amino silane (solid content: 100% by mass): 30 parts by mass

Particles 1 (titanium oxide surface-treated with diantimony pentoxide-doped tin oxide): 1,200 parts by mass Toluene: 6,000 parts by mass Carrier 5 was obtained in the same manner as in Carrier Production Example 1, except that the coating layer forming liquid was replaced with Coating Liquid 5.

The titanium oxide coated with the diantimony pentoxide-doped tin oxide was prepared by coating surfaces of titanium oxide particles (average particle dimeter: 0.4 μm) with diantimony pentoxide-doped tin oxide, where the film thickness of the diantimony pentoxide was adjusted so that specific resistance of the resulting particles of the titanium oxide coated with the diantimony pentoxide-doped tin oxide was to be equivalent to the specific resistance of the diantimony pentoxide-doped tin oxide in Carrier Production Example 3.

Carrier Production Example 6

<Coating Liquid 6>

Acrylic resin solution (solid content: 20% by mass): 200 parts by mass

Silicone resin solution (solid content: 40% by mass): 2,000 parts by mass

Amino silane (solid content: 100% by mass): 30 parts by mass

Particles 1 (aluminium oxide surface-treated with diantimony pentoxide-doped tin oxide): 1,200 parts by mass Toluene: 6,000 parts by mass Carrier 6 was obtained in the same manner as in Carrier Production Example 1, except that the coating layer forming liquid was replaced with Coating Liquid 6.

The aluminium oxide coated with the diantimony pentoxide-doped tin oxide was prepared by coating surfaces of aluminium oxide particles (average particle dimeter: 0.4 μm) with diantimony pentoxide-doped tin oxide, where the film thickness of the diantimony pentoxide was adjusted so that specific resistance of the resulting particles of the aluminium oxide coated with the diantimony pentoxide-doped tin oxide was equivalent to the specific resistance of the diantimony pentoxide-doped tin oxide in Carrier Production Example 3.

Carrier Production Example 7

<Coating Liquid 7>

Acrylic resin solution (solid content: 20% by mass): 200 parts by mass

Silicone resin solution (solid content: 40% by mass): 2,000 parts by mass

Amino silane (solid content: 100% by mass): 30 parts by mass

Particles 1 (aluminium oxide surface-treated with diantimony pentoxide-doped tin oxide): 1,200 parts by mass Iron oxide: 650 parts by mass Toluene: 6,000 parts by mass Carrier 7 was obtained in the same manner as in Carrier Production Example 1, except that the coating layer forming liquid was replaced with Coating Liquid 7.

As the iron oxide, red ocher particles having an average particle diameter of 0.5 μm were used.

Carrier Production Example 8

<Coating Liquid 8>

Acrylic resin solution (solid content: 20% by mass): 200 parts by mass

Silicone resin solution (solid content: 40% by mass): 2,000 parts by mass

Amino silane (solid content: 100% by mass): 30 parts by mass

Particles 1 (aluminium oxide surface-treated with diantimony pentoxide-doped tin oxide): 1,200 parts by mass Particles 2 (titanium oxide): 650 parts by mass Toluene: 6,000 parts by mass Carrier 8 was obtained in the same manner as in Carrier Production Example 1, except that the coating layer forming liquid was replaced with Coating Liquid 8.

As the titanium oxide, white particles having an average particle diameter of 0.5 μm were used.

Carrier Production Example 9

<Coating Liquid 9>

Acrylic resin solution (solid content: 20% by mass): 200 parts by mass

Silicone resin solution (solid content: 40% by mass): 2,000 parts by mass

Amino silane (solid content: 100% by mass): 30 parts by mass

Particles 1 (aluminium oxide surface-treated with diantimony pentoxide-doped tin oxide): 1,200 parts by mass Particles 2 (barium sulfate/zinc sulfide mixture): 650 parts by mass Toluene: 6,000 parts by mass Carrier 9 was obtained in the same manner as in Carrier Production Example 1, except that the coating layer forming liquid was replaced with Coating Liquid 9.

The mixture of the barium sulfate and the zinc sulfide was white particles prepared by blending barium sulfate particles having an average particle diameter of 0.5 μm and zinc sulfide particles having an average particle diameter of 0.5 μm at a ratio of 7:3. The mixture had an average particle diameter of 0.5 μm.

Carrier Production Example 10

<Coating Liquid 10>

Acrylic resin solution (solid content: 20% by mass): 200 parts by mass

Silicone resin solution (solid content: 40% by mass): 2,000 parts by mass

Amino silane (solid content: 100% by mass): 30 parts by mass

Particles 1 (aluminium oxide surface-treated with diantimony pentoxide-doped tin oxide): 1,200 parts by mass Particles 2 (barium sulfate): 650 parts by mass Toluene: 6,000 parts by mass Carrier 10 was obtained in the same manner as in Carrier Production Example 1, except that the coating layer forming liquid was replaced with Coating Liquid 10.

As the barium sulfate, white particles having an average particle diameter of 0.5 μm were used.

The carriers of Carrier Production Examples 1 to 10 are summarized in Table 1. The volume average particle diameter of Particles 1 of each Production Example was from 0.45 μm to 0.60 μm.

TABLE 1

| | | Particles 1 | | Particles 2 | |
|---|---|---|---|---|---|
| | Carrier | Material | Base particles | Material | Color |
| Production Ex. 1 | Carrier 1 | Diantimony pentoxide | NA | NA | NA |
| Production Ex. 2 | Carrier 2 | Carbon black | NA | NA | NA |
| Production Ex. 3 | Carrier 3 | Diantimony pentoxide-doped tin oxide | NA | NA | NA |
| Production Ex. 4 | Carrier 4 | Diantimony trioxide-doped tin oxide | NA | NA | NA |
| Production Ex. 5 | Carrier 5 | Diantimony pentoxide-doped tin oxide | Titanium oxide | NA | NA |
| Production Ex. 6 | Carrier 6 | Diantimony pentoxide-doped tin oxide | Aluminum oxide | NA | NA |
| Production Ex. 7 | Carrier 7 | Diantimony pentoxide-doped tin oxide | Aluminum oxide | Iron oxide | Red ocher |
| Production Ex. 8 | Carrier 8 | Diantimony pentoxide-doped tin oxide | Aluminum oxide | Titanium oxide | White |
| Production Ex. 9 | Carrier 9 | Diantimony pentoxide-doped tin oxide | Aluminum oxide | Mixture of barium sulfate and zinc sulfide | White |
| Production Ex. 10 | Carrier 10 | Diantimony pentoxide-doped tin oxide | Aluminum oxide | Barium sulfate | White |

Example 1

By a mixer, 7 parts by mass of Toner A obtained in Toner Production Example and 93 parts by mass of Carrier 1 produced in Carrier Production Example 1 were mixed and stirred for 10 minutes to thereby prepare Developer 1.

Developer 1 was set in a commercially available digital color printer (imagio MP C6004SP, available from Ricoh Company Limited), and an evaluation was performed with the initial developer. A letter chart having an imaging area rate of 20, was printed on 50,000 sheets, and an image chart having an imaging area rate of 5% was printed on 50,000 sheets. In total, 100,000 sheets were output, and then, an evaluation was performed with the developer that had been used for the printing. The printer had the developing device having the structure equivalent to the structure of FIG. 6.

<Edge Effect>

Image defects due to the edge effect were evaluated with both the initial developer and the used developer.

A test pattern having a large area of an image was output, and the difference between the image density of the central part of the printed image pattern and the image density of the edge of the printed image pattern was observed, and judged based on the following criteria. An image defect due to the edge effect appears as the higher image density at the edge of the image in comparison with the image density at the central part of the image.

Excellent: There was no difference.

Good: There was a slight difference.

Fair: There was a difference, but tolerable.

Not good: There was a difference, and unacceptable.

<Carrier Deposition>

The initial developer and the used developer were both evaluated in the following manner. A solid image and an image having an image pattern including double dotted lines (100 lpi/inch) along the sub-scanning direction were output, and white-blank spots formed were visually observed and judged based on the following criteria. The white-blank spots appear in the image or the image pattern due to the carrier particles deposited on the solid image or between the double dotted lines.

Excellent: No white-blank spot (0 spots)

Good: 1 to 3 white-blank spots

Fair: 4 to 10 white-blank spots

Not good: 11 white-blank spots or more

<Discoloration>

A solid image was output using each of the initial developer and the used developer. The output images were measured by X-Rite.

Specifically, a value ($L_0$*, $a_0$*, and $b_0$*, ID) obtained by measuring the output solid image using the initial developer by X-Rite (X-Rite 938 D50, available from AMTEC CO., LTD.) and a value ($L_1$*, $a_1$*, and $b_1$*, ID') obtained by measuring the solid image output after outputting 100,000 sheets by X-Rite were used to calculate 6E according to the following formula. The results are judged based on the following criteria.

$$\text{Color difference}(\Delta E)=\{(L_0^*-L_1^*)^2+(a_0^*-a_1^*)^2+(b_0^*-b_1^*)^2\}^{1/2} \quad \text{[Formula]}$$

$L_0$*, $a_0$*, and $b_0$*: initial measurement values $L_1$*, $a_1$*, and $b_1$*: measurement values on the solid image after outputting 100,000 sheets

[Evaluation Criteria]

Good: ΔE≤2

Fair: 2<CE 5≤6

Not good: 6<ΔE

The results of "Good" and "Fair" are acceptable for practical use.

<Reduction in Charge>

Each of the initial developer and the used developer was evaluated for a reduction in charge of a carrier.

First, 7% by mass of a toner was mixed with 93% by mass of the initial carrier to charge the mixture with friction to prepare a sample. The obtained sample was measured according to a typical blow-off method (TB-200, available from Toshiba Chemical). The obtained value was determined as the initial charge. Next, the toner was removed from the used developer by the blow-off device to separate the carrier, and 7% by mass of fresh Toner A was mixed with 93% by mass of the separated carrier. Similarly to the preparation of the sample using the initial carrier, the obtained mixture was mixed to charge the mixture with friction to prepare a sample. Similarly to the measurement of the charge of the initial carrier, the charge of the prepared sample was measured. The difference between the initial charge and the measured charge was determined as a reduction in the charge.

A desirable value for the reduction in the charge was less than 15 μC/g.

<Safety>

The material used alone or by covering based particles, as an electrical resistance regulator, in Particles 1 was judged based on the following criteria with reference to The Globally Harmonized System of Classification and Labelling of Chemicals (GHS).

Good: safe

Not good: harmful to human bodies

Examples 2 to 8 and Comparative Examples 1 and 2

Evaluations were performed in the same manner as in Example 1, except that Carriers 2 to 10 were respectively used as the carrier to prepare Developers 2 to 10, respectively.

Example 9

Evaluations were performed in the same manner as in Example 8, except that the printer was replaced with a commercially available digital full-color printer (imagio MP C2504SP, available from Ricoh Company Limited). The printer included the developing device having the structure equivalent to the structure illustrated in FIG. 2.

The carrier of the developer used for each of Examples and Comparative Examples, and the evaluation results of each of Examples and Comparative Examples are presented in Tables 2-1 and 2-2.

Examples 1 to 8 are examples each using the developing device satisfying the condition (1). Example 9 is an example using the developing device not satisfying the condition (1) nor the condition (2). When the developing device satisfying the condition (2) is used, the same effect as the effect obtainable by using the developing device satisfying the condition (1) can be obtained.

TABLE 2-1

| | | | Edge effect | | Carrier deposition | |
|---|---|---|---|---|---|---|
| | Developer | Carrier | Initial developer | Developer after use | Initial developer | Developer after use |
| Ex. 1 | Developer 1 | Carrier 1 | Fair | Fair | Fair | Fair |
| Comp. Ex. 1 | Developer 2 | Carrier 2 | Excellent | Excellent | Excellent | Excellent |
| Ex. 2 | Developer 3 | Carrier 3 | Good | Fair | Good | Fair |
| Comp. Ex. 2 | Developer 4 | Carrier 4 | Good | Fair | Good | Fair |
| Ex. 3 | Developer 5 | Carrier 5 | Good | Good | Good | Good |
| Ex. 4 | Developer 6 | Carrier 6 | Excellent | Good | Excellent | Good |
| Ex. 5 | Developer 7 | Carrier 7 | Excellent | Excellent | Excellent | Excellent |
| Ex. 6 | Developer 8 | Carrier 8 | Excellent | Excellent | Excellent | Excellent |
| Ex. 7 | Developer 9 | Carrier 9 | Excellent | Excellent | Excellent | Excellent |
| Ex. 8 | Developer 10 | Carrier 10 | Excellent | Excellent | Excellent | Excellent |
| Ex. 9 | Developer 10 | Carrier 10 | Excellent | Good | Excellent | Excellent |

TABLE 2-2

| | Discoloration | Reduction in charged amount (μC/g) | Safety |
|---|---|---|---|
| Ex. 1 | Good | 13 | Good |
| Comp. Ex. 1 | Not good | 14 | Good |
| Ex. 2 | Good | 10 | Good |
| Comp. Ex. 2 | Good | 10 | Not good |
| Ex. 3 | Good | 7 | Good |
| Ex. 4 | Good | 7 | Good |
| Ex. 5 | Fair | 5 | Good |
| Ex. 6 | Good | 5 | Good |
| Ex. 7 | Good | 4 | Good |
| Ex. 8 | Good | 1 | Good |
| Ex. 9 | Good | 2 | Good |

What is claimed is:

1. A carrier for electrophotographic image formation, the carrier comprising:

carrier particles, each including:

a core particle; and a coating layer covering the core particle, wherein the coating layer includes diantimony pentoxide-containing particles, wherein each of the diantimony pentoxide-containing particles includes a base particle that is an inorganic particle, and wherein the base particle is a particle of aluminum oxide.

2. The carrier according to claim 1, wherein each of the diantimony pentoxide-containing particles includes diantimony pentoxide-doped tin oxide.

3. The carrier according to claim 1, wherein the coating layer further includes inorganic particles other than the diantimony pentoxide-containing particles.

4. The carrier according to claim 3, wherein the inorganic particles other than the diantimony pentoxide-containing particles are white particles.

5. The carrier according to claim 3, wherein each of the inorganic particles other than the diantimony pentoxide-containing particles includes barium sulfate.

6. The carrier according to claim 5, wherein each of the inorganic particles other than the diantimony pentoxide-containing particles is a particle of barium sulfate alone.

7. A developer for electrophotographic image formation, the developer comprising:

the carrier according to claim 1; and a toner.

8. An electrophotographic image forming apparatus comprising:

an electrostatic latent image bearer; and a developing device including the developer according to claim 7.

9. An electrophotographic image forming apparatus comprising:

an electrostatic latent image bearer; and a developing device that includes a developer bearer and a developer-supplying transporting member, and satisfies the following condition (1) or (2), wherein the developer bearer is configured to rotate with a two-component developer, which includes the carrier according to claim 1 and a toner, borne on a surface of the developer bearer to supply the toner to the electrostatic latent image bearer at a position where the developer bearer faces the electrostatic latent image bearer to perform developing, and wherein the developer-supplying transporting member is configured to transport the two-component developer along an axial direction of the developer bearer and to supply the two-component developer to the developer bearer to form a developer-supplying transportation path with the developer-supplying transporting member,

[Condition (1)]

the developing device further includes a developer-stirring transporting member and a partitioning member, wherein, where an excess developer is the two-component developer that has not been used for developing and is transported to a downstream end of the developer-supplying transportation path relative to a transporting direction of the developer-supplying transportation path, the developer-stirring transporting member is configured to receive the excess developer to transport the excess developer along the axial direction of the developer bearer in a reverse direction to the direction in which the developer-supplying transporting member transports the two-component developer, while stirring the excess developer, to form a developer-stirring transportation path with the developer-stirring transporting member, wherein the developer-supplying transportation path and the developer-stirring transportation path are separated by the partitioning member across a central part in a longitudinal direction of the developer-supplying transportation path and the developer-stirring transportation path, the central part excluding both ends in the longitudinal direction, and wherein the two-component developer borne on the developer bearer and passed through the position where the developer bearer faces the electrostatic latent image bearer is recovered into the developer-stirring transportation path, the recovered two-component developer is mixed with the excess developer transported via the developer-stirring transportation path, and the mixed developer is supplied from the downstream end of the developer-stirring transportation path to the developer-supplying transportation path,

[Condition (2)]

the developing device further includes a developer-recovering transporting member, a developer-stirring transporting member, and a partitioning member, wherein the developer-recovering transporting member is configured to recover the two-component developer that is borne on the developer bearer and is passed through the position where the developer bearer faces the electrostatic latent image bearer, and to transport the recovered two-component developer along the axial direction of the developer bearer in the same direction as the direction in which the developer-supplying transporting member transports the two-component developer, to form a developer-recovering transportation path with the developer-recovering transporting member, wherein, where an excess developer is the two-component developer that has not been used for developing and is transported to a downstream end of the developer-supplying transportation path relative to the transportation direction of the developer-supplying transportation path, and a recovered developer is the two-component developer that is recovered by the developer-recovering transporting member, the developer-stirring transporting member is configured to receive the excess developer and the recovered developer to transport the excess developer and the recovered developer along the axial direction of the developer bearer in a reverse direction to the direction in which the developer-supplying transporting member transports the two-component developer, while stirring the excess developer and the recovered developer, to form a developer-stirring transportation path with the developer-stirring transporting member, and wherein the developer-supplying transportation path, the developer-recovering transportation path, and the developer-stirring transportation path are separated from one another by the partitioning member.

10. An electrophotographic image forming method comprising:

forming an image with the developer according to claim 7.

11. An electrophotographic image forming method comprising:

using an electrophotographic image forming apparatus including an electrostatic latent image bearer, a developing device, and a developer for electrophotographic image formation where the developer is a two-component developer including the carrier according to claim 1 and a toner, wherein the developing device includes a developer bearer and a developer-supplying transporting member, and satisfies the following condition (1) or (2), wherein the developer bearer is configured to rotate with the two-component developer borne on a surface of the developer bearer to supply the toner to the electrostatic latent image bearer at a position where the developer bearer faces the electrostatic latent image bearer to perform developing, and wherein the developer-supplying transporting member is configured to transport the two-component developer along an axial direction of the developer bearer and to supply the two-component developer to the developer bearer to form a developer-supplying transportation path with the developer-supplying transporting member,

[Condition (1)]

the developing device further includes a developer-stirring transporting member and a partitioning member, wherein, where an excess developer is the two-component developer that has not been used for developing and is transported to a downstream end of the developer-supplying transportation path relative to a transporting direction of the developer-supplying transportation path, the developer-stirring transporting member is configured to receive the excess developer to transport the excess developer along the axial direction of the developer bearer in a reverse direction to the direction in which the developer-supplying transporting member transports the two-component developer, while stirring the excess developer, to form a developer-stirring transportation path with the developer-stirring transporting member, wherein the developer-supplying transportation path and the developer-stirring transportation path are separated by the partitioning member across a central part in a longitudinal direction of the developer-supplying transportation path and the developer-stirring transportation path, the central part excluding both ends in the longitudinal direction, and wherein the two-component developer borne on the developer bearer and passed through the position where the developer bearer faces the electrostatic latent image bearer is recovered into the developer-stirring transportation path, the recovered two-component developer is mixed with the excess developer transported via the developer-stirring transportation path, and the mixed developer is supplied from the downstream end of the developer-stirring transportation path to the developer-supplying transportation path,

[Condition (2)]

the developing device further includes a developer-recovering transporting member, a developer-stirring transporting member, and a partitioning member, wherein the developer-recovering transporting member is configured to recover the two-component developer that is borne on the developer bearer and is passed through the position where the developer bearer faces the electrostatic latent image bearer, and to transport the recovered two-component developer along the axial direction of the developer bearer in the same direction as the direction in which the developer-supplying transporting member transports the two-component developer, to form a developer-recovering transportation path with the developer-recovering transporting member, wherein, where an excess developer is the two-component developer that has not been used for developing and is transported to a downstream end of the developer-supplying transportation path relative to the transportation direction of the developer-supplying transportation path, and a recovered developer is the two-component developer that is recovered by the developer-recovering transporting member, the developer-stirring transporting member is configured to receive the excess developer and the recovered developer to transport the excess developer and the recovered developer along the axial direction of the developer bearer in a reverse direction to the direction in which the developer-supplying transporting member transports the two-component developer, while stirring the excess developer and the recovered developer, to form a developer-stirring transportation path with the developer-stirring transporting member, and wherein the developer-supplying transportation path, the developer-recovering transportation path, and the developer-stirring transportation path are separated from one another by the partitioning member.

12. A process cartridge comprising:

the developer according to claim 7; and a developing device configured to develop a latent electrostatic image with the developer.

* * * * *